United States Patent
Jurica et al.

(10) Patent No.: US 6,799,792 B2
(45) Date of Patent: Oct. 5, 2004

(54) VEHICLE BED EDGE AND MANUFACTURING PROCESS

(75) Inventors: Joseph J. Jurica, Macomb County, MI (US); Arnold L. Brown, Macomb, MI (US); Gregory B. Taylor, Rochester Hills, MI (US)

(73) Assignee: Pullman Industries, Inc., Troy, MI (US)

( * ) Notice: Subject to any disclaimer, the term of this patent is extended or adjusted under 35 U.S.C. 154(b) by 0 days.

(21) Appl. No.: 10/220,932

(22) PCT Filed: Feb. 23, 2001

(86) PCT No.: PCT/US01/06299

§ 371 (c)(1),
(2), (4) Date: Sep. 6, 2002

(87) PCT Pub. No.: WO01/66301

PCT Pub. Date: Sep. 13, 2001

(65) Prior Publication Data

US 2003/0047964 A1 Mar. 13, 2003

Related U.S. Application Data

(60) Provisional application No. 60/187,556, filed on Mar. 7, 2000.

(51) Int. Cl.[7] .............................................. B62D 25/20
(52) U.S. Cl. .................................... 296/184.1; 29/897.2
(58) Field of Search ................................ 29/897, 897.2, 29/897.3, 897.23, 471; 52/798.1, 800.11; 72/313, 279.6, 379.6; 296/29, 30, 39.1, 182, 183, 184, 189, 184.1

(56) References Cited

U.S. PATENT DOCUMENTS

| | | | |
|---|---|---|---|
| 2,199,377 A | 4/1940 | Tangerman |
| 4,109,503 A | 8/1978 | Francon et al. |
| 4,188,058 A | 2/1980 | Resa et al. |
| 5,188,418 A | 2/1993 | Walworth, Jr. et al. |
| 5,544,932 A | 8/1996 | Walworth, Jr. et al. |
| 5,575,525 A | 11/1996 | Walworth, Jr. et al. |
| 5,730,486 A | 3/1998 | Jurica |
| 5,938,272 A | 8/1999 | Jurica et al. |
| 6,128,815 A | 10/2000 | Jurica et al. |
| 6,170,905 B1 | 1/2001 | Jurica |
| 6,347,454 B1 | 2/2002 | Jurica et al. |

Primary Examiner—Lori L. Coletta
(74) Attorney, Agent, or Firm—Flynn, Thiel, Boutell & Tanis, P.C.

(57) ABSTRACT

A roll-formed one-piece vehicle bed member having plural downwardly-opening channel-like ribs extending longitudinally of the bed member and terminating at front and rear edges. The ribs adjacent one end are deformed to define rib portions which slope downwardly from the top of the ribs for merger with a flat transverse edge flange. The top wall of the sloped rib portion has a center wall portion which is offset downwardly relative to side edge portions which join the center wall portion to side walls of the rib.

23 Claims, 16 Drawing Sheets

VEHICLE BED EDGE AND MANUFACTURING PROCESS

This application claims the benefit of Provisional Application No. 60/187,556, filed Mar. 7, 2000.

FIELD OF THE INVENTION

This invention relates to a bed member for a vehicle, such as a truck, which is roll formed so as to have alternating channel-like ribs and valleys extending longitudinally thereof, and more specifically to a bed member having an improved tapered end structure associated with the channels so that the channels adjacent an edge of the bed are longitudinally tapered downwardly for merger into the plane defining the bottom of the bed.

BACKGROUND OF THE INVENTION

To improve upon the construction of truck bed members which are formed using a conventional stamping process, the assignee of this application developed the improved truck bed structures and forming methods disclosed in U.S. Pat. Nos. 5,188,418, 5,544,932, 5,575,525, 5,730,486, 5,938,272, 6,128,815, and all of which are assigned to Pullman Industries, Inc., and are herein incorporated by reference.

In the aforesaid patents, and as illustrated in FIG. 1, there is disclosed a main floor pan or bed member 11 which was developed principally for a pick-up truck so that the bed member 11 is disposed between the side walls 12 of the truck and extends rearwardly from the front wall 13 so as to terminate at the rear sill 14. The bed member has the rear edge thereof secured, typically by welding, to the rear sill 14, and the bed member is typically supported on and fixedly secured to additional cross sills which are spaced longitudinally along the bed, such as the intermediate cross sills 15 and the front sill 16. The bed member 11 is roll formed from a continuous sheet of thin steel so as to have alternating ribs 18 and valleys 19 of channel-like cross-section disposed sidewardly thereacross with such ribs and valleys extending longitudinally along the roll formed sheet. The roll formed sheet is then cut to length to define the bed member, which bed member hence has the front and rear edges thereof having a corrugated configuration defined by the alternating ribs and valleys. In a preferred variation of this invention, the rear sill 14 is provided with protruding projections 17 on the top wall thereof, which projections interfit within the channels of the bed member 11 at the rear edge thereof to provide for a strong structural assembly while also closing off the rear ends of the ribs.

The arrangement described above and as briefly illustrated in FIG. 1 has proven to provide a highly desirable bed assembly, but in a continuing effort to provide for and accommodate other demands associated with the use of such vehicles, the assignee hereof has also developed a modified end construction for the bed member 11 which, as illustrated by FIGS. 2–5, results in the ends of the ribs 18 being flattened downwardly through a tapered or downwardly sloped rib section so as to merge with the bottom of the bed member, namely the walls which define the bottoms of the valleys, so as to effect closure of the ends of the ribs and at the same time result in the edge of the bed member being generally flat.

The construction illustrated by FIGS. 2–5, as disclosed in copending U.S. application Ser. No. 09/196,979 (now replaced by copending continuation U.S. application Ser. No. 09/611,444) owned by the assignee hereof and incorporated herein by reference, results in a modified edge construction for the roll-formed bed member 11 so as to permit the edge portion of the bed to be supported on a conventional cross sill 21 (which can be either a rear sill or a front sill) without the necessity of providing the top wall of the sill with upward projections for nesting within the channels of the ribs, although provision of such projections on the cross sill is still a preferred alternative. In this edge construction, the bed member 11 is provided with a flat and substantially planar flange 22 extending transversely across the bed member, which flange terminates at a free edge 23 of the bed member. The flange 22 is defined by deforming and hence flattening rear portions of the channel-like ribs 18 over a selected longitudinal length which projects forwardly from the free edge 23.

The bed member 11 of FIGS. 2–4 in addition has the ribs 18 thereof, just forwardly of the flange 22, downwardly deformed to define tapered rib portions 18A which extend longitudinally of the bed member over a small longitudinal distance, and define a transitional zone between the rear flange 22 and the longitudinally-extending full-height rib 18. The tapered rib portions 18A each have a top wall 25A which at one end is continuous with and joins to the top wall 25 of the full-height rib 18, with the top wall 25A then angling or sloping downwardly as it projects longitudinally until intersecting the plane of the bed member base walls 26 (the latter defining the bottom of the valleys 19), which intersection substantially defines the transition between the tapered rib portions 18A and the rear flange 22. The tapered rib portions 18A thus effectively define a slope or ramp which projects upwardly from the elevation of the base walls 26 or flange 22 to the elevation of the rib top walls 25, with the ramp projecting in a longitudinal direction which, when the tapered rib portion is at the rear edge of the bed member, slopes upwardly in the forward direction of the bed member to thus eliminate or minimize any abrupt or sharp corners at the rear edge of the bed member.

The tapered rib portions 18A are shaped by physically deforming a selected length of the full-height ribs 18 downwardly into the tapered or sloped configuration, which forming typically is carried out in a shaping press following the roll forming of the bed member. The deforming (i.e. compressing) of the ribs 18 into the tapered configuration results in at least partial collapsing of the side walls 27 of the ribs, and the tapered rib portion 18A is preferably formed so that the top wall 25A thereof extends at a slope or angle relative to the horizontal of at least about 30°, and more preferably in the neighborhood of about 40° to about 45°, in an effort to minimize the amount of material which is being physically displaced during the compression of the ribs into the tapered shape.

During the deforming of the end portions of the ribs 18 so as to form the tapered rib portions 18A, the end portions of the ribs 18 which extend between the tapered portions 18A and the rear edge 23 are also substantially simultaneously flattened during the same deforming or pressing operation so that the rib portions which extend throughout the longitudinal length of the flange 22 are effectively flattened so as to be substantially coplanar with the base walls 26 and thereby result in the substantially flat and planar edge flange 22.

With the arrangement as illustrated by FIG. 2, the flange 22 can be positioned so as to lie flatly on an upper surface of the cross sill so as to permit closure and fixed securement therewith.

Alternatively, the flattened rear flange, designated 22A in FIG. 5, can be bent downwardly in the vicinity adjacent or slightly rearwardly from the intersection point with the tapered rib-portions 18A, which flange 22A can be disposed so as to project downwardly directly adjacent and hence overlap a side surface of the supporting cross sill 21, such as the rear surface when the cross sill 21 constitutes the rear sill of the vehicle bed construction. In this arrangement the flange 22A can be fixedly secured to the cross sill, such as by welding.

While the rib end constructions illustrated by FIGS. 2–5 may be desirable for some use situations, nevertheless these rib end constructions created by reforming a roll-formed bed member result in undesired wrinkling of the material during the deforming or flattening operation. In order to deform the full-height rib into either the tapered rib portion and/or the flat rear flange, it is necessary to cause the excess material which exists due to the presence of the side walls 27 to be redistributed so as to merge into the material associated with the adjacent top or bottom walls 25 and 26. Because of this excess material, stamping of the rear ends of the ribs is normally unable to effectively redistribute this excess material, and hence the tapered rib portions 18A particularly in the vicinity of the sides thereof, and particularly the flat rear flange 22 in the vicinity where the side walls 27 previously existed, often exhibit significant wrinkling due to the excess material so that the resulting wall structure not only loses its desired uniformity of thickness but also results in undesired surface characteristics which may be considered unacceptable, particularly when painting or the like.

Accordingly, in a continuing effort to improve the construction of bed members formed initially by roll forming, and which are then subjected to further forming such as pressing so as to define tapered end configurations similar to those depicted by FIGS. 2–5, the present invention relates to an improved tapered rib end configuration and an improved forming process which permits end portions of the roll-formed ribs to be subsequently deformed, as by stamping, and which improved construction and process eliminates or at least greatly minimizes undesired wrinkling by permitting more effective redistribution of excess material during the deforming operation, and which in addition provides the resulting tapered rib portion with increased strength and rigidity.

The improved construction of the present invention, and advantages resulting therefrom, will be apparent upon reading the following specification and inspecting the accompanying drawings.

Figure 1:
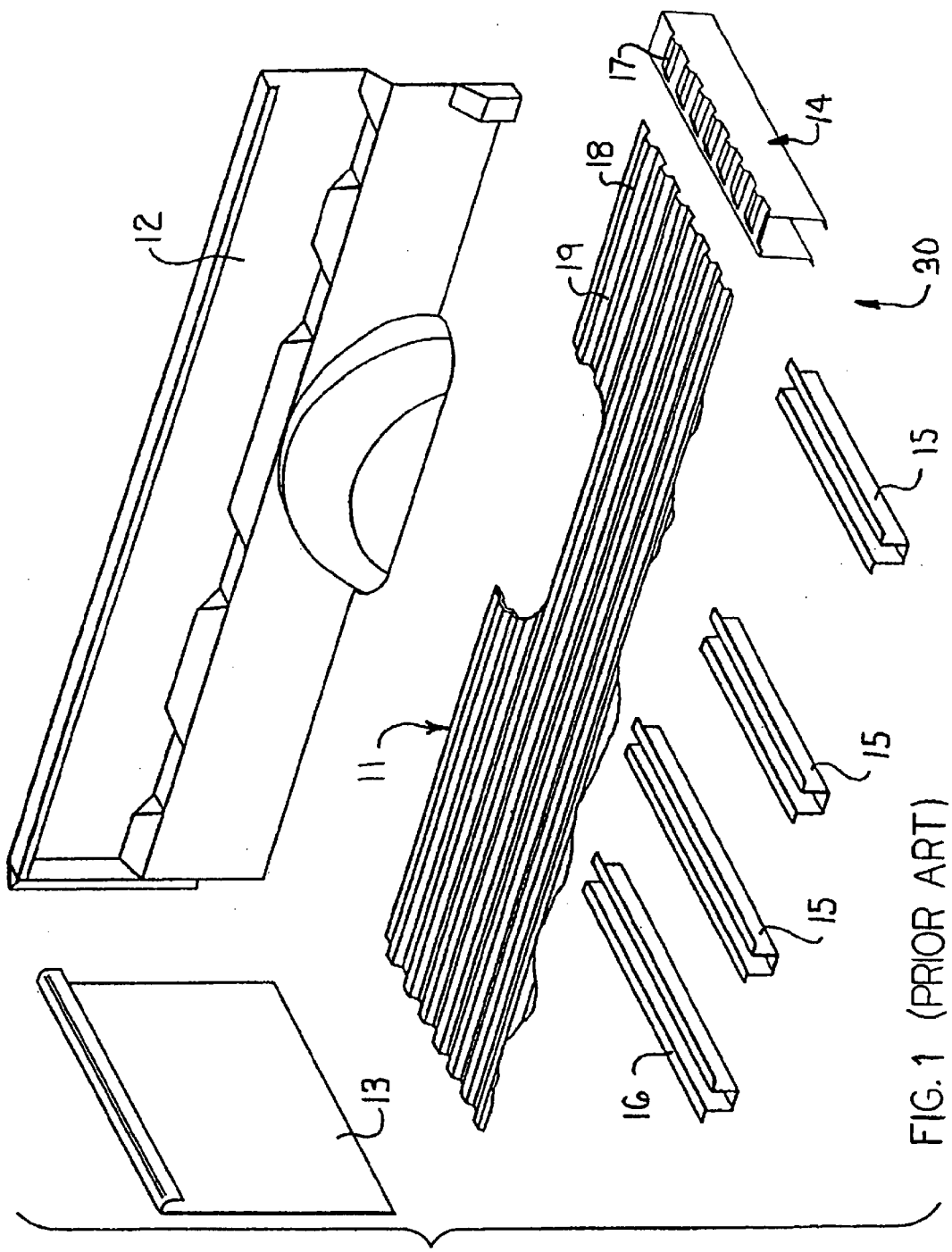
FIG. 1 is an exploded perspective view illustrating the basic components which cooperate with the pan or bed member of a truck according to the prior art.

Certain terminology will be used in the following descriptions for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the bed member and designated parts thereof. Said terminology will include the words specifically mentioned, derivatives thereof, and words of similar import.

DETAILED DESCRIPTION

Figure 6:
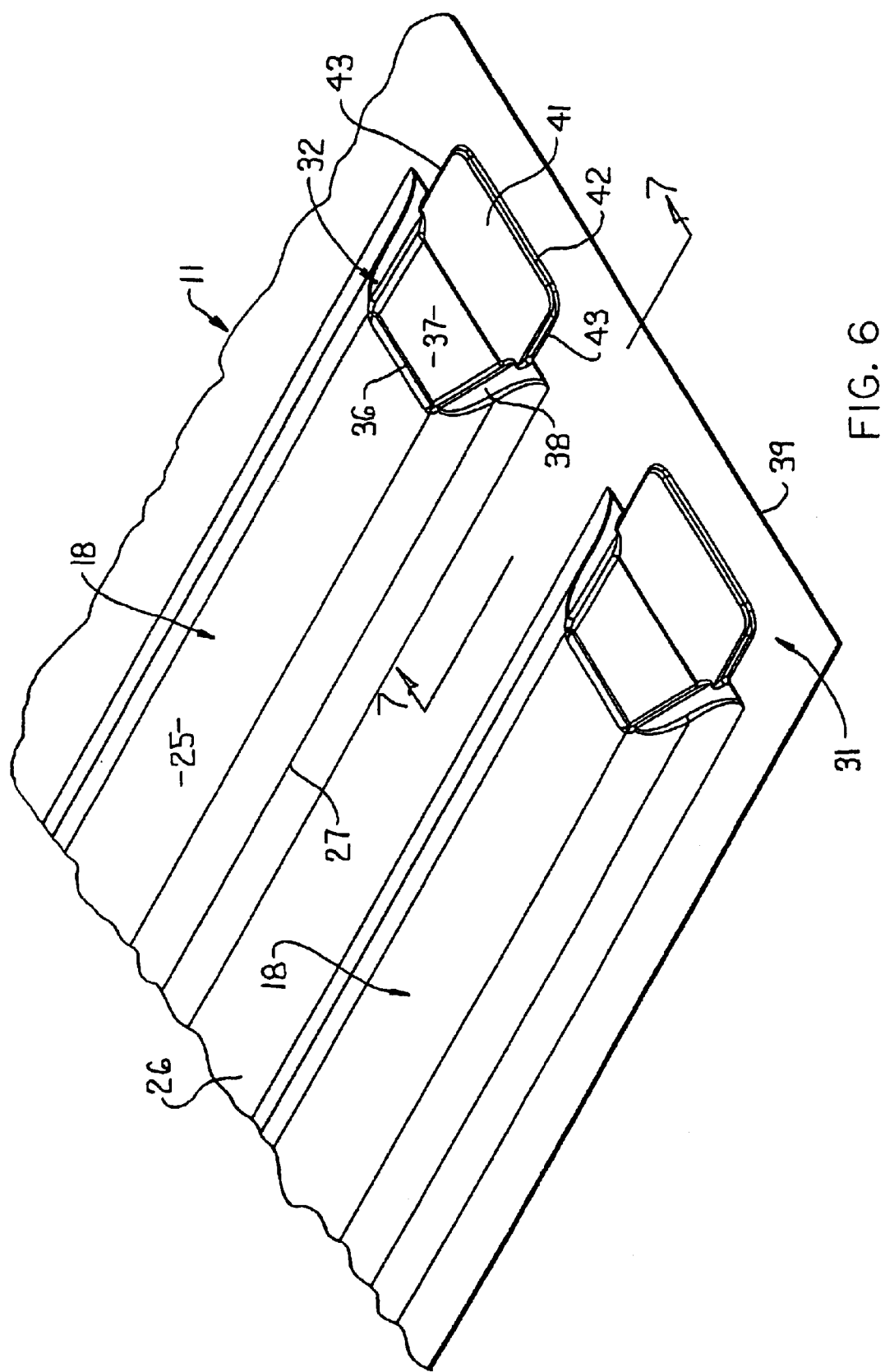
FIG. 6 is a fragmentary perspective view which illustrates the improved tapered end construction associated with channels of a roll-formed bed member according to the present invention.

Referring to FIG. 6, there is illustrated a portion of a vehicle bed member 11 which is of an integral one-piece construction formed by longitudinally roll forming a thin metal sheet such that the sheet initially has downwardly-opening channel-like ribs 18 extending longitudinally in sidewardly spaced but parallel relationship, with these ribs being sidewardly spaced by intermediate valleys 19. The ribs 18 are, in the improved bed member of this invention, provided with a flat flange 31 along at least one transverse end edge thereof, which flange joins to the ribs 18, with the latter having tapered rib end portions 32 associated therewith similar to the arrangements of FIGS. 2–5 except that the tapered rib portions 32 and the flange 31 are both shaped so as to compensate for the excess material which exists during flattening of the ends 35 of the ribs 18 to thus eliminate or at least greatly minimize the presence of wrinkles either in the tapered rib end portion 32 or in the end flange 31.

Figure 7:
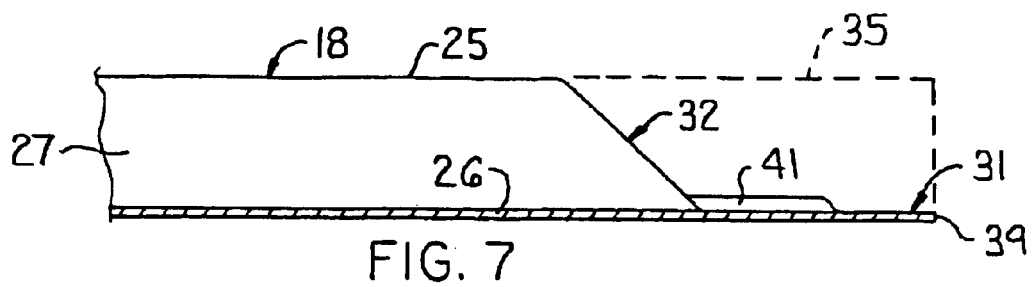
FIG. 7 is a fragmentary side view of the tapered end portion of the rib as taken generally along line 7—7 of FIG. 6.
Figure 8:
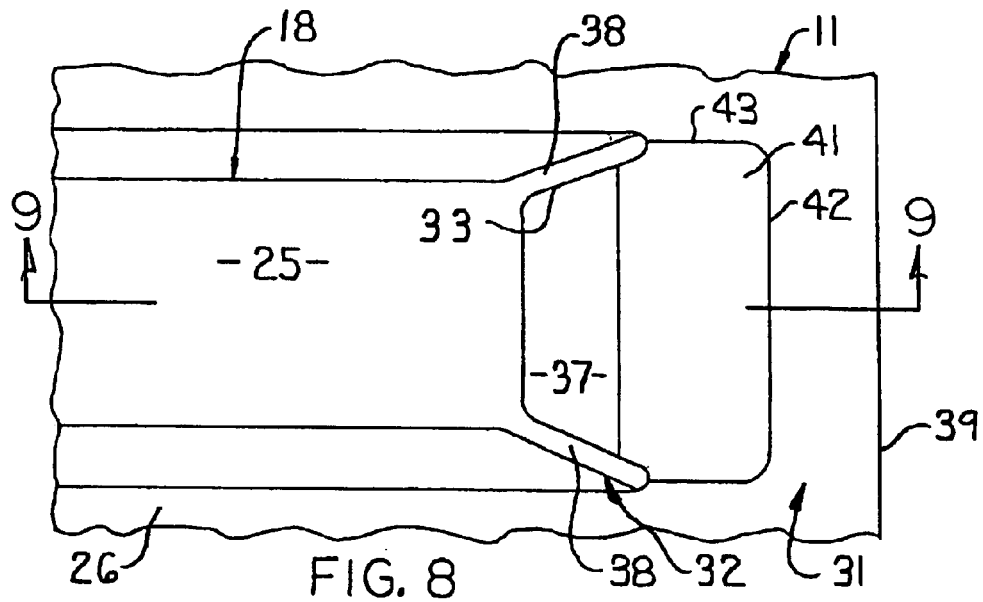
FIG. 8 is a top view of the rib end portion illustrated in FIG. 7.
Figure 9:
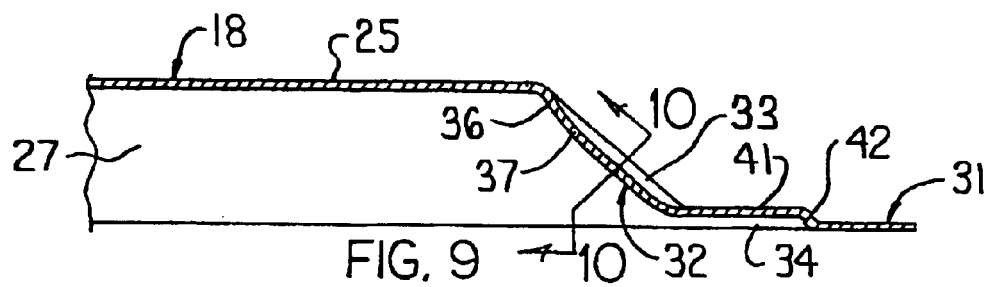
FIG. 9 is a fragmentary sectional view taken generally along line 9—9 of FIG. 8.
Figure 10:
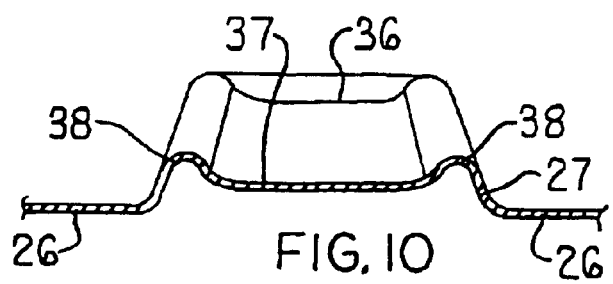
FIG. 10 is a fragmentary sectional view taken along line 10—10 in FIG. 9.

In the improved arrangement of this invention, the top wall of the tapered rib portion 32 is offset downwardly relative to the top and side edges thereof so as to define a shallow downwardly-offset recess 33, and the flange 31 where it merges with the tapered rib portion is, over a selected longitudinal extent of the flange 31, offset upwardly so as to define a recess 34. These recesses 33 and 34 are substantially simultaneously formed during flattening or deforming of the rib end portion, which flattening basically involves that portion of the rib which extends to the free end of the bed member, substantially as diagrammatically depicted by dotted lines 35 in FIG. 7. During flattening of the rib end portion 35 so as to define the tapered rib end portion 32 and the flattened edge flange 31, the forming or pressing die is configured so as to substantially simultaneously effect formation of the recess 33 in the top wall of the tapered rib portion 32, and formation of the upwardly opening recess 34 in a contiguous part of the edge flange 31.

With respect to the construction of the tapered rib portion 32, this portion longitudinally merges with the top wall 25 of the rib 18 such that, during the deforming of the rib end portion 35, the top wall 25 at its juncture to the tapered rib portion 32 is bent downwardly through a substantially reverse bend, i.e., a shallow S-curve bend 36, for merger with a generally flat but downwardly sloped end wall 37 of the tapered rib portion 32. This substantially flat end wall 37 extends transversely (i.e., sidewardly) between raised edge portions 38 which slope downwardly from their juncture with the top rib wall 25 in parallel relation to the top sloped wall 37. The edge portions 38 extend generally along the side walls 27 of the rib for merger with the flat and planar flange 31 at a location spaced longitudinally from the free edge 39 of the flange. The edge portions 38 effectively protrude upwardly above the tapered end wall 37 so as to define the downward offset recess 33 therebetween. The projections 38 are of a generally upwardly rounded arcuate shape so as to provide a continuous merger between the end wall 37 and the rib side walls 27. Due to the provision of the recess 33 and the downward offset of the tapered end wall 37 created thereby, this results in the formation of the arcuate projections 38 which have a generally downwardly-opening channel or U-shaped configuration so that these projections hence require additional material to form, and thus compensate for the excess material created during the deformation process.

During the forming of the tapered rib portion 32 as discussed above, the deformation of the rib end portion 35 also results in simultaneous formation of the flat edge flange 31, and the latter is also additionally and substantially simultaneously deformed so as to create therein the recess 34 which in effect results in formation of a raised wall or platform 41 which joins to the lower edge of the tapered top wall 37 and which projects longitudinally outwardly of the flange 31 so as to terminate at a rear edge 42 which is still spaced longitudinally from the free edge 39. This platform 41 in the illustrated embodiment preferably has a width which approximately corresponds to the spacing between the raised side protrusions 38 adjacent the lower ends thereof where these protrusions merge into the flange 31. The raised wall or platform 41 is preferably generally flat or planar, and is generally parallel with but raised upwardly from the flange 31, with the side edges 43 of the platform 41 generally being disposed so as to merge in with the lower side edges of the tapered top wall 37.

In accordance with an alternative embodiment not shown here, the distance defined between the lower ends of the respective raised edge portions 38 (as measured transversely relative to the longitudinal direction of bed member 11) may be slightly less than that shown so that these lower ends merge more directly into platform 41 adjacent the front edge thereof but are still spaced longitudinally from the free edge 39.

The creation of the platform 41 accordingly results in the formation of the edge walls 42 and 43 which extend generally vertically and join the raised platform 41 to the flange 31, whereby these edge walls 42 and 43 hence require additional material to permit formation thereof. These walls 42, 43 are thus formed using much of the excess material which is created during flattening of the rib end portion 35. Further, these edge walls 42 and 43 function similar to the channel-like edge protrusions 38 in that they function generally as upright ribs which provide increased structural strength so that the overall tapered end portion of the rib thus has increased durability and crush resistance.

Figure 2:
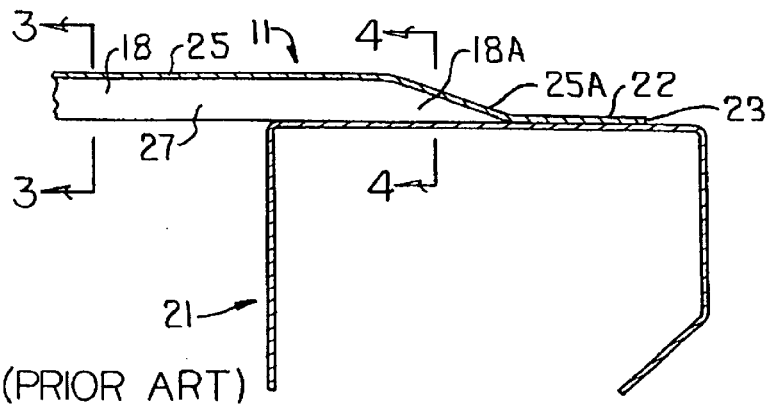
FIG. 2 is an enlarged fragmentary cross-sectional view illustrating a modified end construction of a roll-formed bed member and its connection to a cross sill according to a prior development of the assignee hereof.
Figure 3:
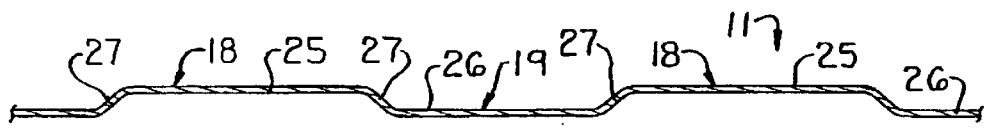
FIG. 3 is a fragmentary cross-sectional view taken generally along line 3—3 in FIG. 2 and showing the cross-section of the roll-formed bed member.
Figure 4:
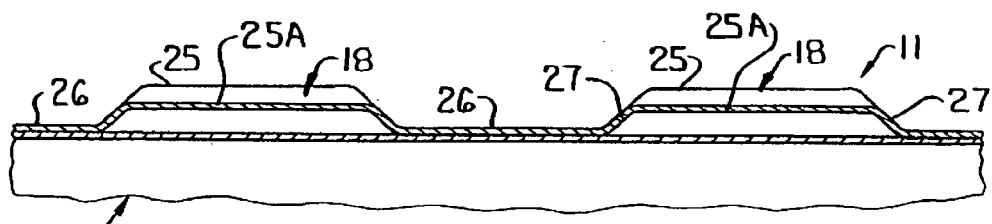
FIG. 4 is a fragmentary cross-sectional view taken generally along line 4—4 in FIG. 2 and showing the cross-section through the tapered rib portions of the bed member.
Figure 5:
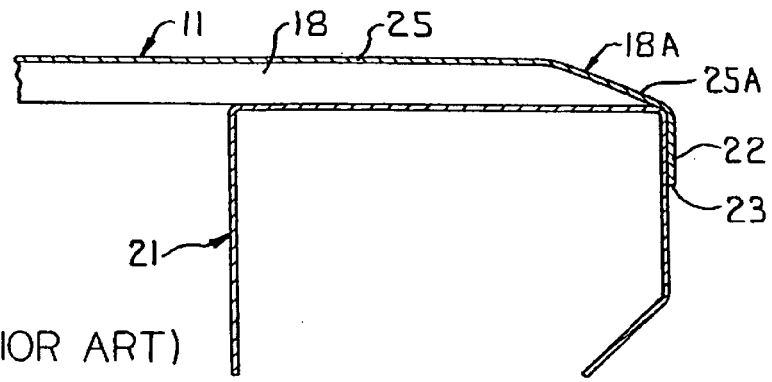
FIG. 5 is a view similar to FIG. 2 but illustrating a variation thereof.

The raised platforms 41 preferably have their edges 42 terminated in spaced relation from the free edge 39 of the flange 31 so that the flange 31 still has a generally planar rear portion which extends along the entire rear free edge 39 thereof so as to permit the planar rear portion of the flange 39 to directly overlie and permit fixed securement thereof to the top surface of a sill similar to the arrangement illustrated in FIG. 2. If desired, the rear flat portion of the flange 31, namely that portion rearwardly of the raised platforms 41, can be bent downwardly so as to permit overlap and fixed securement to a side wall of a sill in a manner similar to that illustrated by FIG. 5.

In the FIG. 6 embodiment, the depth of the recess 33, which depth is the amount that the end wall 37 is offset downwardly from the normal slope angle as a result of the reverse curvature of the top bend 36, as well as the depth of the recess 34 defined under the platform 41, is preferably selected so as to be at least equal to and preferably greater than, such as about 1.5 times, the thickness of the sheet material defining the bed member. In a typical construction the bed member may have a thickness of about 0.040 inch and the recesses 33 and 34 may have a depth of about 0.060 inch. This is believed to provide sufficient additional linear wall length to compensate for the excess wall material which is created during flattening or deforming of the rib end portion 35, without resulting in significant wrinkling of the resulting bed member. Further, with this arrangement, the additional vertical wall section provided by the sides of the protrusions 38 and the platform edge walls 42 and 43 significantly increases both the cross-sectional area and the vertical column cross-section to thus provide significantly increased strength and durability.

With the improved bed member of this invention, the one-piece roll-formed bed member can be formed generally to occupy only the center portion of the truck bed, namely that portion which extends between the wheel wells of the vehicle, or in the alternative the one-piece bed member may be formed so as to define the entire truck bed width by having the wheel wells cut therefrom. Both of these variations are disclosed in the assignee's earlier patents, identified above, and are encompassed within the present invention. Further, while the tapered rib end construction of this invention is particularly desirable for use at the rear edge of the bed member for cooperation with the rear sill of the vehicle, it will be appreciated that the improved rib end construction of this invention is equally applicable for use at the front end of the bed member, either by itself or in conjunction with use of the same or similar rib end construction at the rear end of the bed member.

Figure 11:
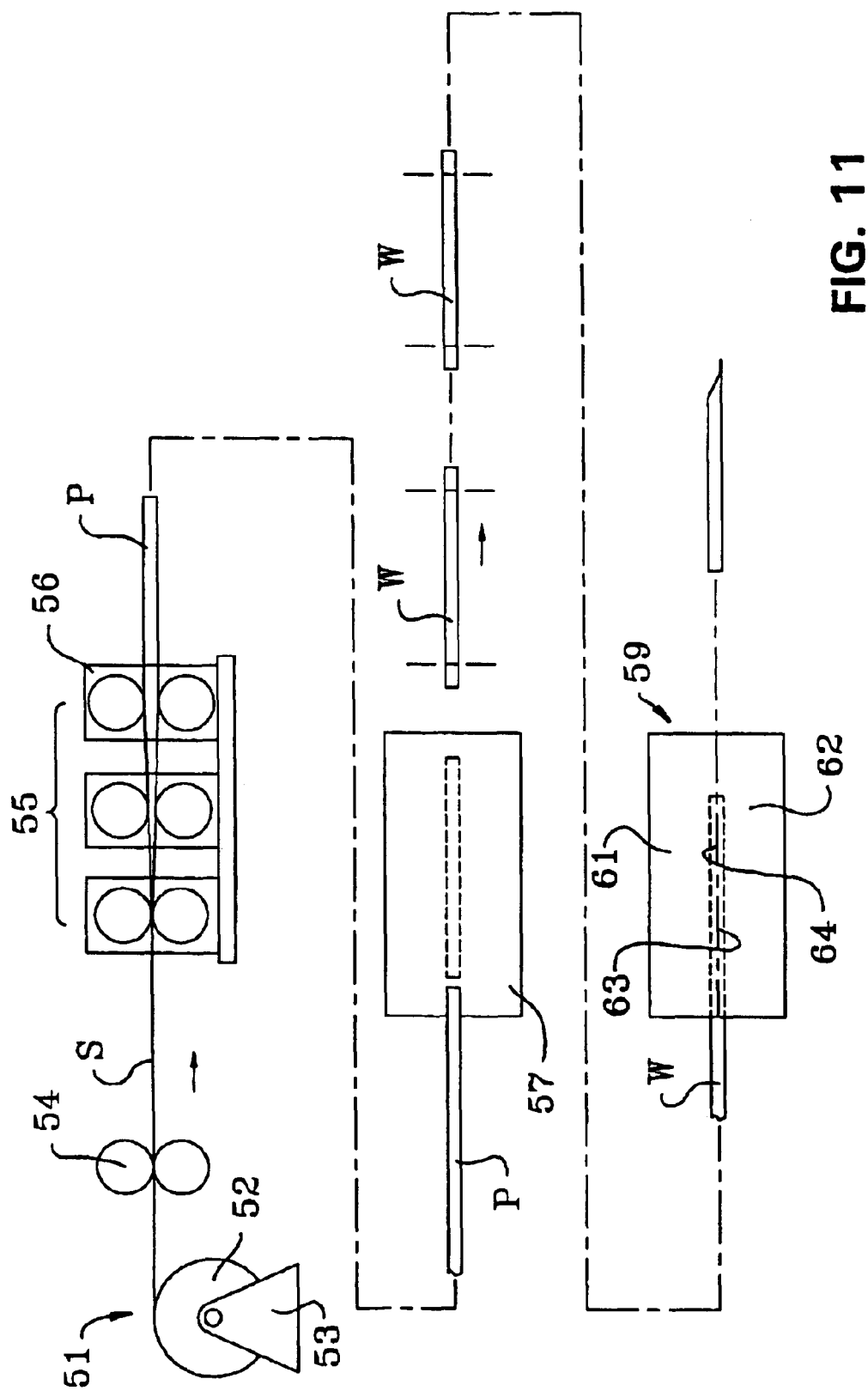
FIG. 11 is a flow diagram which illustrates the improved forming process according to the present invention.

To effect forming of the improved vehicle bed according to the present invention, and specifically a bed member having one or both ends provided with a flat rear flange and tapered rib end portions as discussed above relative to FIGS. 6–10, reference is made to FIG. 11 which diagrammatically illustrates the forming process for the bed member.

More specifically, the forming process includes a supply station 51 which includes a large spool 52 of thin sheetlike metal, such as thin sheet steel, with the spool being rotatably supported on a supply stand 53. The thin sheet material, designated S, is withdrawn from the spool and supplied through drive rollers 54 which forwardly advance the wide but thin continuous sheet S in the lengthwise or longitudinal direction thereof into and through a conventional roll former or mill 55. The latter includes a plurality of roller units 56 disposed in adjacent series relationship along the direction of movement of the sheet, and each roller unit 56 typically includes upper and lower rollers which cooperate with opposed surfaces of the sheet S to deform same into the desired configuration. In the present invention the roll former 55 and particularly the series of roller units 56 act on the sheet starting at the middle and then work progressively outwardly toward opposite sides thereof so as to effect reshaping of the sheet to effect formation of the series of ribs 18 which extend longitudinally and substantially continuously in the lengthwise direction of the sheet as the sheet leaves the roll former 55. With this process, the thickness of the sheets is maintained with a high degree of uniformity throughout the entire cross section of the sheet when the latter has been formed so as to have the ribbed cross-sectional configuration required by the bed member, and thus highly improved strength, performance and aesthetics are achieved.

The reshaped sheet S leaving the roller mill 55 has a continuous three-dimensional profile and is designated P in FIG. 11, and is thereafter fed into a cutting or shearing station 57 which can effect cutting of the continuous profile P into workpieces W of predetermined length. These workpieces W are sized so as to effectively constitute individual bed members and hence have a length corresponding thereto, except that the length of the workpiece W is, in the forming process of the present invention, slightly greater than the finished length of the bed member so as to permit reshaping of one or both ends of the workpiece as explained hereinafter.

Figure 12:
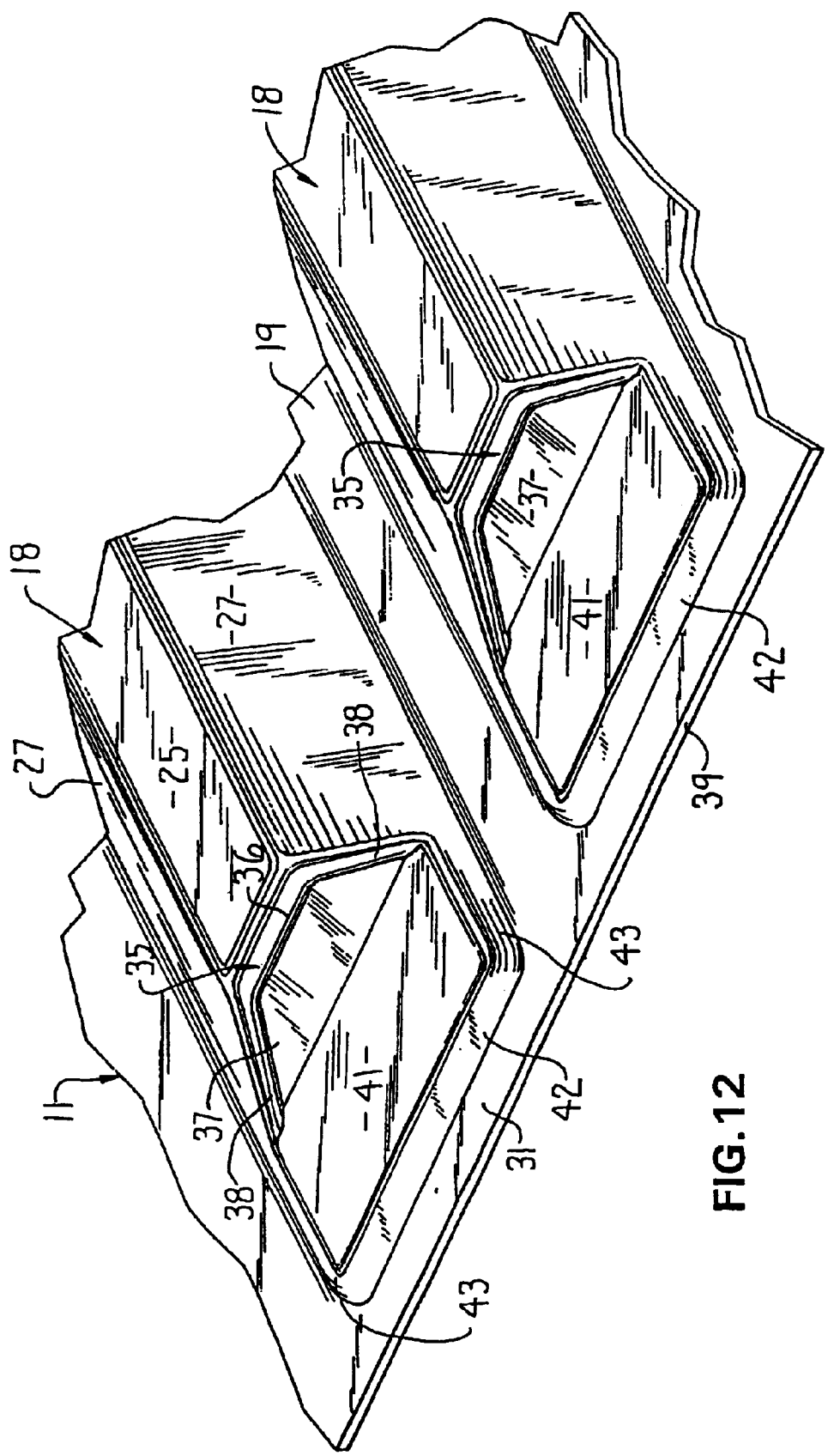
FIG. 12 is a fragmentary perspective view, taken from an upper side, and illustrating the improved bed member of the present invention and specifically the tapered rib portions associated with the bed member ribs.

The workpiece W has the ribs 18 extending longitudinally throughout the length thereof so that the front and rear edges of the workpiece W have a corrugated configuration. The workpieces W thereafter have the rear and/or front end portions thereof subjected to a reshaping operation to permit formation of end portions which include tapered rib portions and a flat edge flange substantially as illustrated by FIG. 12. This reshaping of one or both end portions of the workpiece W is carried out in a forming or reshaping press 59 which, as diagrammatically illustrated in FIG. 11, includes upper and lower forming dies 61 and 62, respectively, which are relatively vertically movable from a closed reshaping position as illustrated in FIG. 11 into an open position wherein the upper and lower dies are vertically spaced. The end portion of the workpiece W is positioned between the upper and lower dies 61 and 62, and is acted on by opposed forming surfaces 63 and 64 to permit reshaping of the end portion of the workpiece W.

The reshaped end portion of the bed member as illustrated in FIG. 12 and specifically the reshaped ends of the ribs 18 so as to define the tapered rib end portions 32 and end flange 31 substantially corresponds to the configuration described above relative to FIGS. 6–10 except that the platform 41 in the arrangement of FIG. 12 is of slightly greater height and of slightly greater width such that the side edges 43 of the platform are substantially aligned with and effectively constitute extensions of the rib side walls 27. The tapered rib end portion 32 and the associated edge flange 31 shown in FIG. 12 are indicated by the same reference numerals utilized to designate the corresponding parts of the tapered rib end portion illustrated in FIGS. 6–10.

The shaping die 59 and specifically the configuration and cooperation of the upper and lower stamping dies 61 and 62, and their cooperation with the workpiece W, will now be described with reference to FIGS. 13–19.

Figure 13:
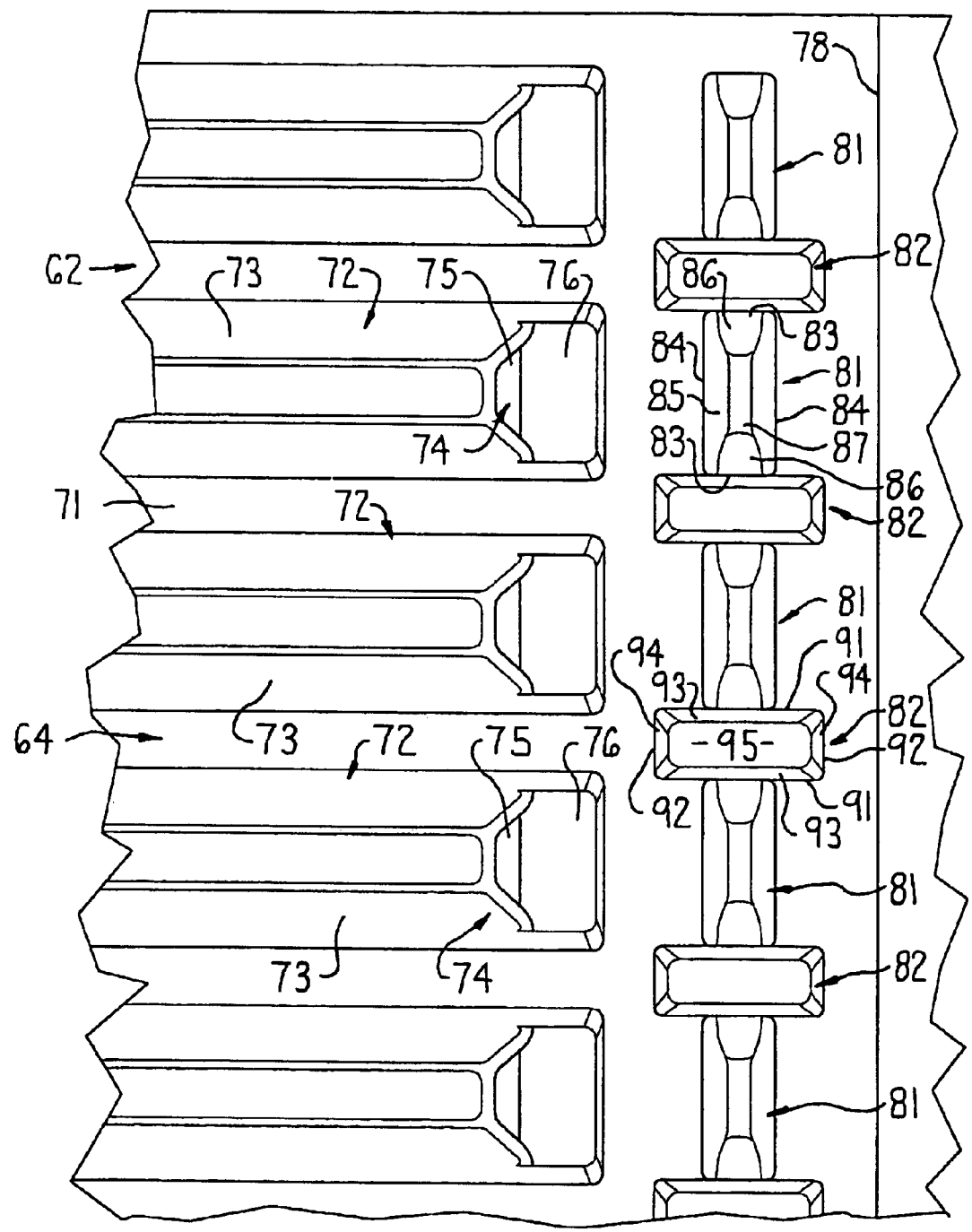
FIG. 13 is a fragmentary top view which illustrates the upper forming surface of the lower die used for forming the tapered rib end portions of the bed member.
Figure 14:
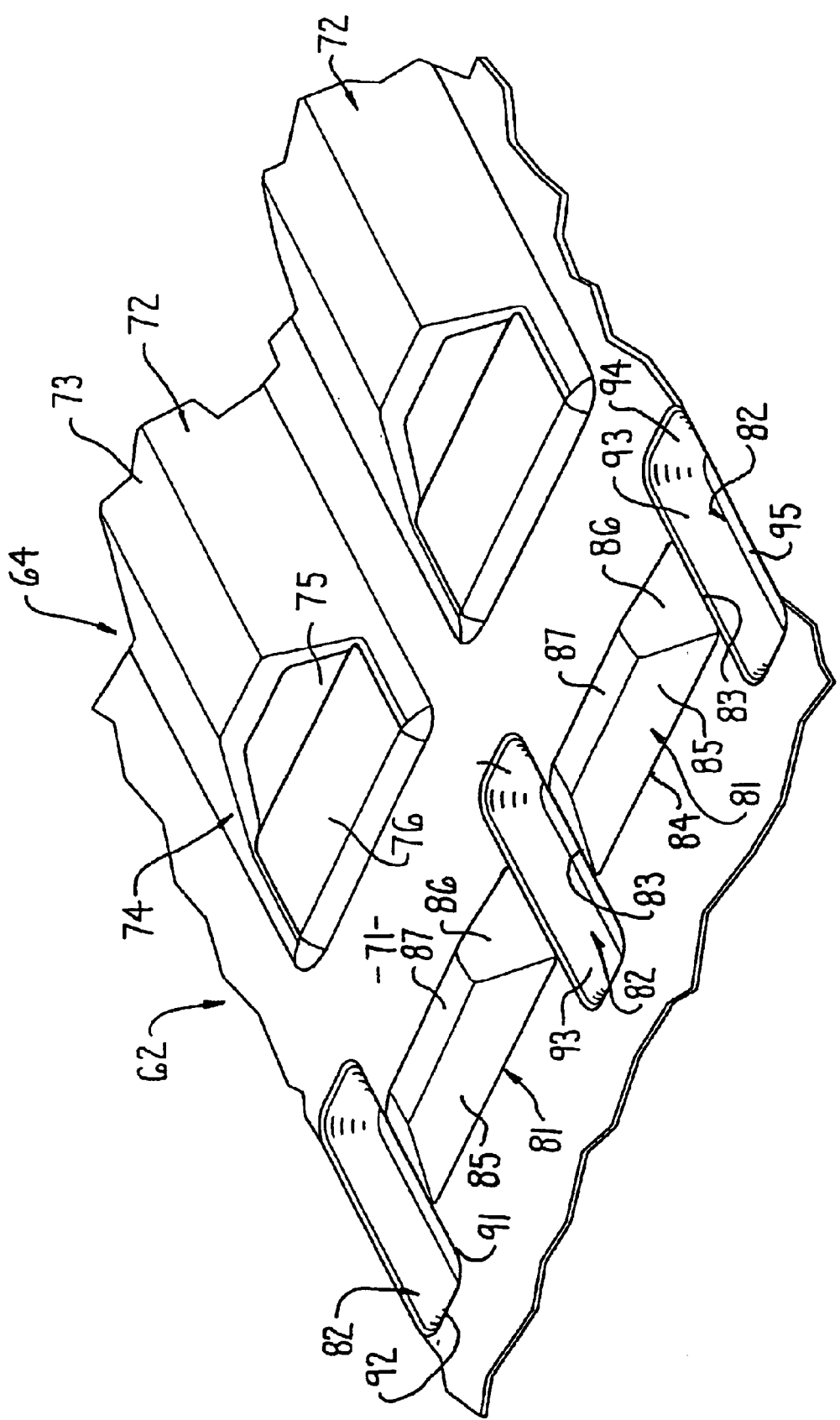
FIG. 14 is a fragmentary perspective view, taken from above, and illustrating the upper forming surface associated with the lower forming die.

The upper forming surface 64 as defined on the lower die 62, as illustrated in FIGS. 13 and 14, includes a substantially planar surface 71, and a plurality of substantially identical male support parts 72 project upwardly from the surface 71 in generally parallel and sidewardly spaced relation. The male support parts 72 each includes an upwardly projecting main support portion 73 which is elongated parallel with the surface 71 and which, in cross section, is configured to snugly nest into the underside of the rib 18 as formed in the workpiece so as to provide supportive engagement therewith. The workpiece valleys 19 are supported on the portions of surface 71 which are defined between the male support parts 72.

Each male support part 72, at one end of the main support portion 73, is provided with an end portion 74 which is configured to define the bottom side configuration of the tapered rib portion 32. More specifically, the end portion 74 of each male support part 72 includes a sloped part 75 which joins to and slopes downwardly from the main support portion 73, and which merges into a raised platform part 76. The configuration of the sloped part 75 and platform part 76 are such as to provide supportive engagement with the wall of the workpiece rib during rib shaping and deforming thereof so as to control the shaping of the rib portion 32 and platform 41 consistent with the configuration of these portions as described above and as illustrated in FIG. 12.

The lower die member 62, in the illustrated arrangement, is also provided with an upwardly projecting shoulder 78 which is spaced longitudinally from the platform parts 76. The shoulder 78 can be utilized to positionally abut the end of the workpiece W when same is positioned in the stamping die arrangement 59.

The lower die member 62 also has, in the longitudinal region between the shoulder 78 and the ends of the platform parts 76, first and second pluralities of material reshaping contours 81 and 82. These contours 81 and 82 protrude in opposite directions from the surface 71 and are disposed in alternating relationship within a generally aligned row which extends transversely, i.e., perpendicularly, relative to the longitudinally extending direction of the male support parts 72.

More specifically, contours 81 are defined by male parts or projections (i.e., anvils) which protrude upwardly from the surface 71, with these projections being spaced from but generally longitudinally aligned with the respective male support parts 72. The individual contours 81 are elongated in the transverse direction so as to have a transverse dimension which substantially corresponds to the transverse width of the support parts 72. These contours also have, in this transverse direction, a cross-sectional shape and size which corresponds to the cross section of main male part 73 so as to nest within the ribs 18.

The contours 82, on the other hand, are formed as female parts or recesses which project downwardly from the surface 72, and these recesses are disposed so that the longitudinal centers thereof are generally aligned with the valleys defined between adjacent male support parts 72. The contours or recesses 82 are elongated in the longitudinally extending direction of the support parts 72, and have a transverse width which is similar in magnitude to the transverse width of the valley.

Considering now in greater detail the configuration of the contours or male parts 81, each is defined at its intersection with the plane 71 by parallel side edges 82 which join through rounded corners to generally parallel end edges 84, with the latter edges 84 having a length which corresponds generally to the transverse width of the male support part 72. The edges 83 and 84 which define the merger of the projection 81 with the surface 71 thus have a rectangular configuration which is generally elongate in a direction perpendicular to the longitudinally extending direction of the male support parts 72.

The contour or projection 81 projects upwardly from the edges 83 and 84, and in cross section transverse to the end edges 84 has a generally rounded convex outer surface 85 which extends over a significant portion of the transverse length of the projection and which, at opposite ends, joins to sloped side walls 86 which slope upwardly from the side edges 83 in generally converging relationship to one another. The rounded surface 85 defines thereon a generally straight top wall 87 which extends between the sloped side surfaces 86.

Considering now the details of the female contour or recess 82, the merger of this recess with the plane 71 is defined by generally parallel side edges 91 which join through rounded corners to generally parallel end edges 92, whereby the mouth or opening of the contour 82 as defined in the surface 71 thus has a generally elongate rectangular configuration which is elongated with the centerline thereof generally aligned with the centerline of the valley between adjacent male support parts 72. The recess or contour 82 is defined by a pair of opposed side walls 93 which join to and project downwardly from the side edges 91, and these opposed side walls 93 in turn are joined together by a further pair of opposed side walls 94 which project downwardly from the end edges 92. The opposed side walls 93 are each sloped inwardly as they project downwardly so that the opposed side walls 93 converge, and the other side walls 94 are also sloped inwardly and converge as they project downwardly. The side walls 93 and 94 are joined through rounded corners to a generally flat bottom wall 95 which is positioned a substantial distance below the surface 71. More specifically, the bottom wall 95 is spaced downwardly from surface 71 by a distance which is greater than the height of male part 72 and anvil 81.

As illustrated in FIG. 13, the female contours or recesses 82 are disposed in an alternating fashion relative to the male contours 81, and these contours 81 and 82 are disposed with their elongated (i.e., longitudinal) dimensions oriented in generally perpendicular relationship to one another. The female contours 82 are also disposed so that they project longitudinally inwardly toward the male support parts 72 beyond the innermost end edge 84 (i.e., the end edge 84 closest to the platform part 76). When viewed from above, as illustrated by FIG. 13, the male contour 81 and the inwardly (i.e., leftwardly) projecting ends of the straddling pair of female contours 82 thus effectively define a shallow channel or U-shaped contour which is longitudinally spaced from but opens toward and partially surrounds the platform part 76.

Figure 15:
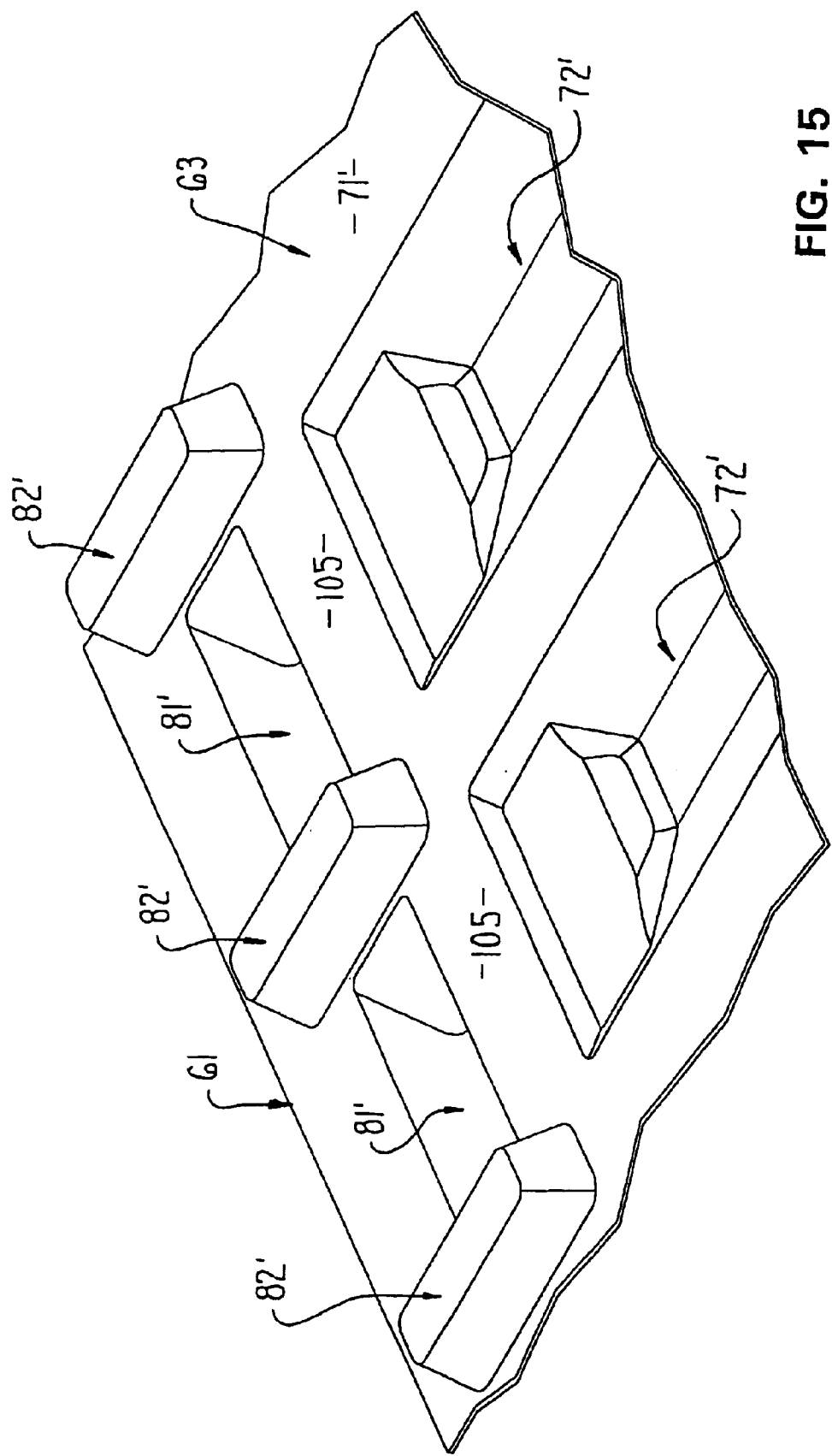
FIG. 15 is a fragmentary perspective view, taken from below, and illustrating the bottom forming surface associated with the upper forming die.
Figure 16:
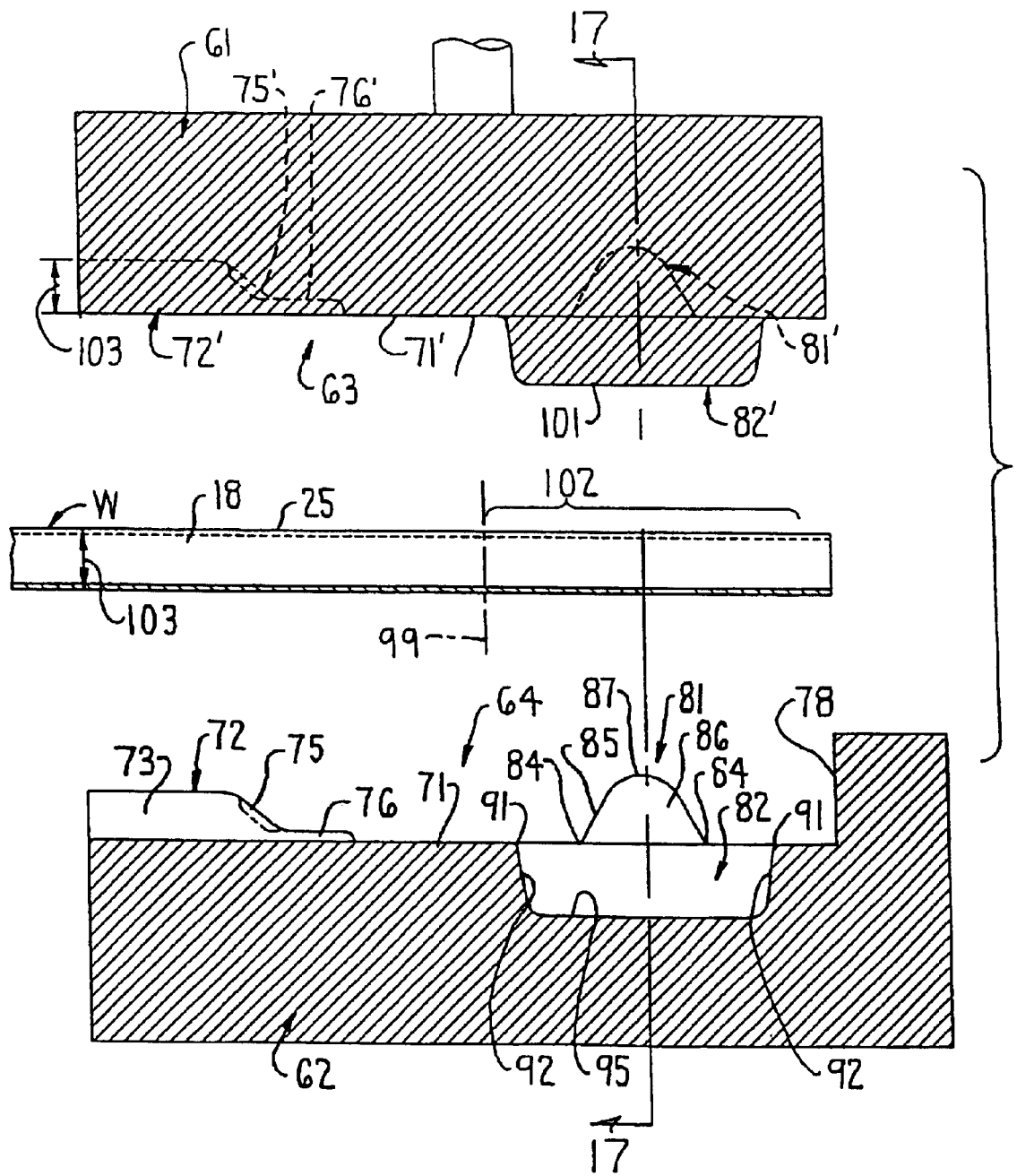
FIG. 16 is an exploded, sectional view taken generally in the plane 16—16 in FIG. 13 and illustrating the configuration of the upper and lower forming surfaces and the disposition of the end of the bed member therebetween prior to reshaping of the bed member.
Figure 17:
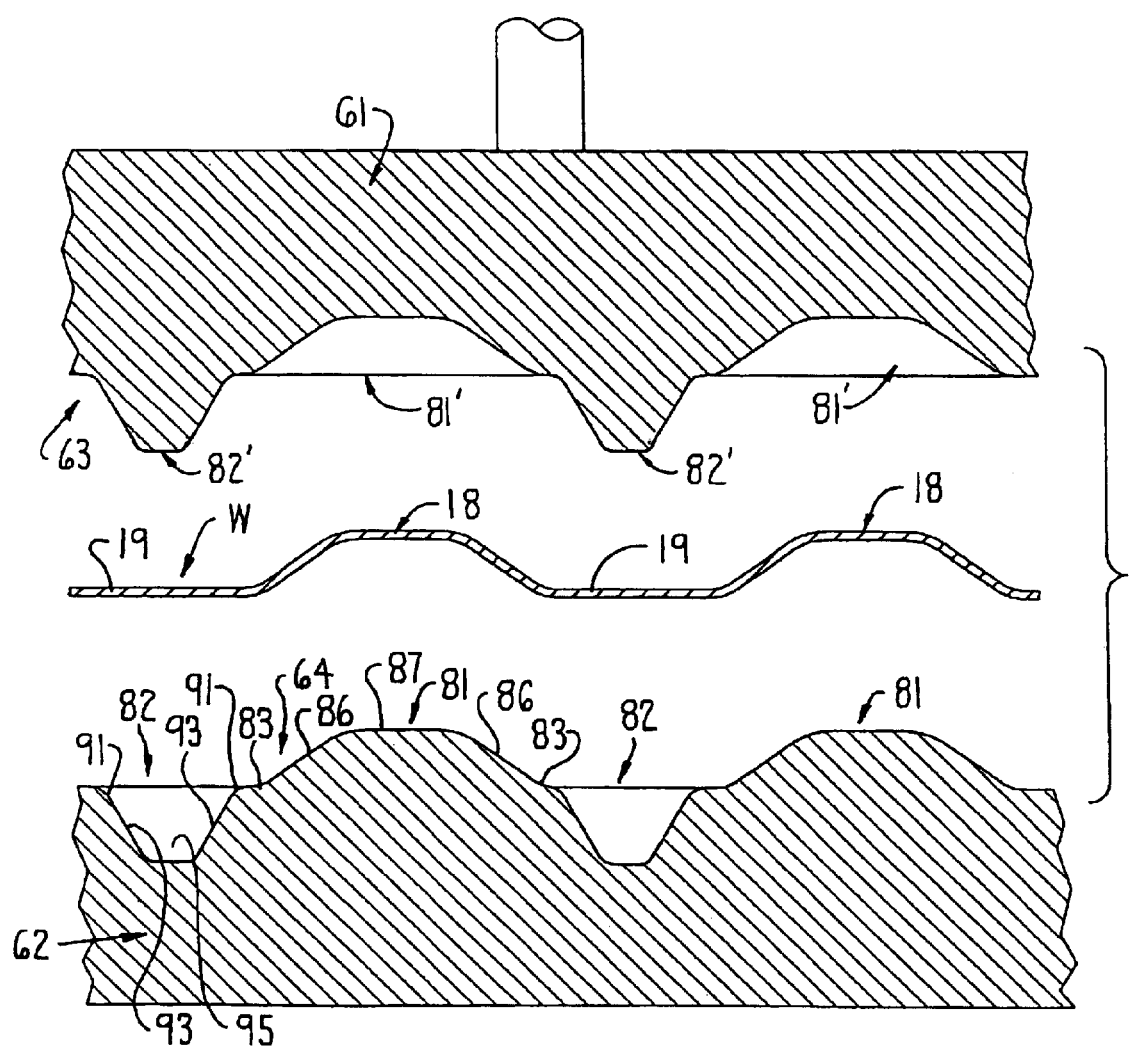
FIG. 17 is a sectional view taken generally along line 17—17 in FIG. 16.

Considering now the bottom forming surface 63 as defined on the top forming die 61, and referring to FIG. 15, the bottom forming surface 63 is substantially identical to the top forming surface 64 except for being a vertical reversal thereof. That is, the bottom forming surface 63 has a bottom planar surface 71' which is generally parallel with and corresponds to the upper planar surface 71 of the lower die. Further, this bottom forming surface 63 has forming recesses 72' formed therein which open upwardly from the surface 71' but which correspond in shape and size to the male support projections 72 provided on the lower die 62. The upper die 61 also has a row of alternating material shaping contours 81' and 82' associated therewith, with the contours 81' being recesses which open upwardly from the surface 71' and being sized and shaped so as to be compatible and effectively nestable with the contours or male projections 81 associated with the lower die. Similarly, the surface forming contours 82' constitute male projections which project downwardly from the surface 71' and are positioned, shaped and sized corresponding to the female contours 82 of the lower die so as to matingly nest therewith when the dies are closed. These male projections 82' have a height (as measured below surface 71') which is greater than the depth of recesses 72'. The female shaping recesses 72' and the female contours or recesses 81' as formed in the upper die are positioned, sized and shaped so as to create a nesting relation with the respectively opposed male support parts 72 and male contours or projections 81 when the dies 61 and 62 are closed, except that the recesses in the upper die 61 are slightly larger than the male projections associated with the lower die so as to accommodate the thickness of the bed member sheet material therebetween. In similar fashion, the male contours 82' on the upper die are positioned, sized and shaped corresponding to the female contours 82 on the lower die so as to permit a nesting relationship therebetween, with the female contours 82 being slightly larger than the male contours 82' so as to accommodate the thickness of the bed member sheet material therebetween.

The upper forming die 61 in the illustrated and preferred embodiment is preferably defined by three die parts 61A, 61B and 61C which are all vertically and independently movable between open and closed positions relative to the bottom die 62. Each of the upper die parts 61A, 61B and 61C can be independently vertically driven, such as by a conventional air or nitrogen pressure cylinder, and the die parts are positioned in slidably adjacent relationship so that the upper die part 61A has the main rib support recesses 73' associated therewith so that this die part 61A can initially be moved downwardly into a closed position to effect clamping of the workpiece W between the upper die part 61A and the lower die 62. The intermediate upper die part 61B defines thereon the configurations which are used to reform the rib 18 to create the tapered rib end, the platform and the flat rear flange, and the other upper die part 61C has surface formations so as to define thereon the contours 81' and 82'. While the upper die parts 61B and 61C can be formed separately and can be individually driven so as to maximize the flexibility of their use during the stamping operation, it will be appreciated that the die parts 61B and 61C can also be joined for synchronous movement or formed as a single die part.

To effect reshaping of the end portions of the ribs 18 associated with the workpiece W, the end of the workpiece is supportively positioned on the forming face 64 associated with the lower die 62, and the positioning of the bed member can be controlled by abutting the end edge thereof against the shoulder 78. In this disposition, the male support parts 72 project upwardly into and supportingly engage the ribs 18 at a location spaced from the free end of the workpiece W. The male contours 81 also project upwardly into the interior of the ribs. The top die 61 is then moved downwardly into a closed position with the lower die 62. During the closing movement of the die parts 62B and 62C, the unsupported end portions of the ribs 18 are appropriately reshaped so as to result in formation of the tapered rib end portion 32 joined to the flat projecting platform portion 41, with the platform portion 41 in turn being joined to a flat flange portion 31 which extends transversely across the entire width of the workpiece. In addition, the inter-fitting of the contours 81–81' and 82–82' causes the material of the workpiece to be deformed so that the edge portion of the reshaped workpiece thus has formed therein a plurality of hollow three-dimensional deformations 87 and 88 which respectively protrude upwardly and downwardly from the base plane of the workpiece and are disposed alternatingly within a row which extends transversely across the workpiece in the vicinity of the free edge thereof. The deformations 97 are formed as a result of the interfitting of the male contours 81 into the female contours 81', and the deformations 98 are formed as a result of the interfitting of the male contours 82' into the female contours 82.

Figure 18:
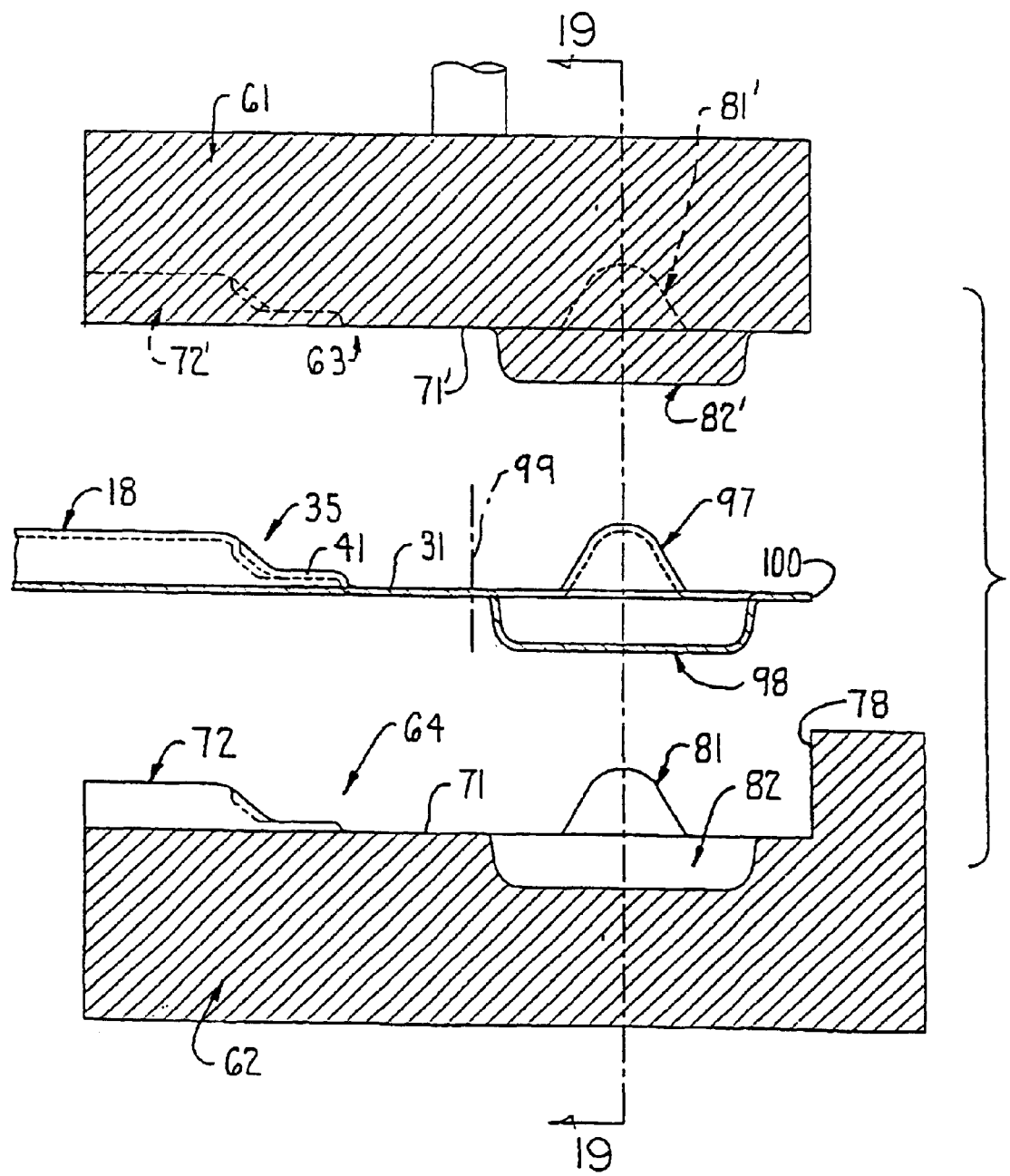
FIG. 18 is an exploded sectional view similar to FIG. 16 but illustrating the configuration of the end of the bed member after it has been reshaped by the forming dies.
Figure 19:
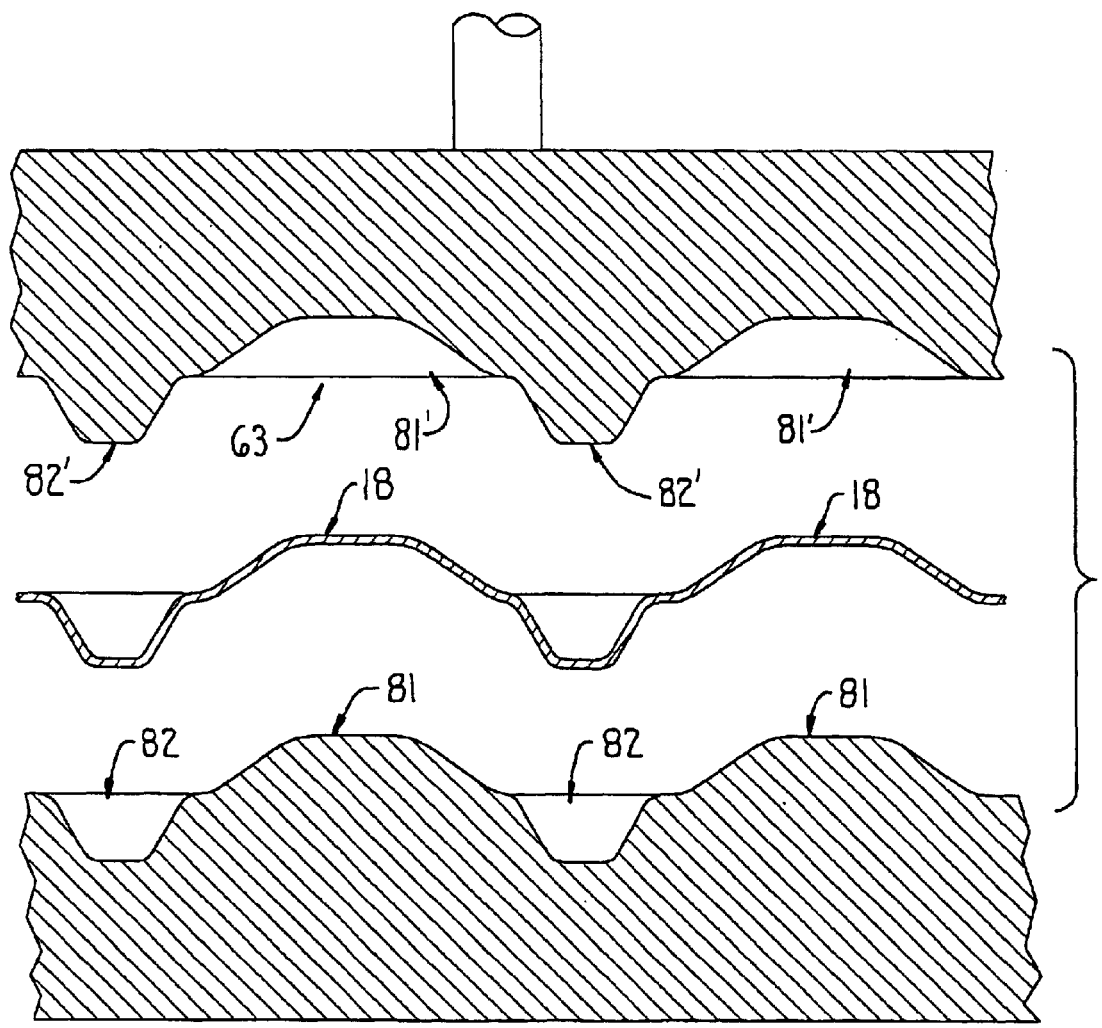
FIG. 19 is a sectional view taken generally along line 19—19 in FIG. 18.

After the workpiece has been deformed between the shaping dies 61 and 62 so as to have the contours 97–98 associated therewith substantially as illustrated in FIG. 18, the reshaped workpiece W can then be transversely sheared or cut across the width thereof, such as indicated approximately by the plane 99 in FIG. 18, whereby the deformed edge section 102 which extends between the plane 99 and the edge 100 is then disposed of as scrap. The cut at the plane 99 thus defines the free edge of the bed member.

In the stamping die according to a preferred embodiment of the invention, the male contour member or anvil 81 has a transverse cross section, as defined by the top wall 87 and sloped end walls 86, which substantially corresponds to the profile of the inner wall of the rib 18 so as to be disposed substantially in engagement with the inner rib wall when the end of the workpiece is supportively engaged with the lower die 62. In addition, the male contour parts or side formers 82' associated with the upper die 61 are positioned so as to closely sidewardly straddle an opposed anvil 81 during the forming process, and the bottom surfaces 101 of the side formers 82' are spaced downwardly from the surface 71' by a distance which preferably slightly exceeds, such as by about 2 to 3 mm. in a preferred embodiment, the height 103 of the rib 18, which height 103 is also substantially identically provided by the rib-receiving recess 72' which projects upwardly from the surface 71'. These relationships, and specifically the extra downward length of the side formers 82', assists in proper stretching of the metal sheet and particularly displacement of excess material during the reshaping of the sheet as explained hereinafter.

The stamping of the rib end portions so as to permit forming of the sloped rib end portions 32 and adjoining platforms 41, and the adjoining flat edge flange 31, will now be briefly described.

The substantially uniform thickness of the workpiece W, which thickness exists not only in the valleys 19 but also throughout the cross section of the ribs 18, results in excess material when the rib end portion 35 is reshaped, which excess material must be effectively removed or relocated in order to result in the tapered rib portion 35, platform 41 and end flange 31 all having substantially uniform exterior surfaces which are generally free of wrinkles or blemishes.

Accordingly, the workpiece W is positioned in engagement with the lower die 62, generally by being abutted against the shoulder 78 so as to provide for proper positioning thereof, in which position the male supporting parts 72 and anvils 81 project upwardly into supportive engagement with the underside of the ribs 18. The top die part 61A is initially moved downwardly to effectively clamp the workpiece on the lower die. The top die part 61C is then moved downwardly and initial contact occurs between the bottom surfaces 101 associated with the side formers 82' and the upper surfaces of the valleys 19. When the bottom surfaces 101 of side formers 82' contact the valleys 19 (i.e., the contact position), the forming surface 105 which is formed on the underside of the top die (part?) 61B is still spaced upwardly from the top wall 25 of the rib 18.

As the top die part 61C continues to move downwardly from the contact position toward the lower die during the next small distance (i.e., 2 to 3 mm.) of travel, the side formers 82' and their sideward straddling of the anvil 81 which is positioned in the region therebetween causes the valleys 19 under the side formers 82' to be deformed downwardly and this hence causes the rib 18 where it contacts the anvil 81 to be sidewardly stretched over the anvil and partially deformed around the upper portion of the anvil. This causes initial stretching of metal away from the main rib support part 73 longitudinally toward the anvil 81. At this time the forming surface 105 on top die part 62B has now been moved into contact with the top wall 25 of the rib 18. Further and simultaneous downward movement of the top die parts 61B and 61C causes the top wall 25 of the rib, where it engages the forming surface 105, to be pressed downwardly, and the progressive downward movement causes the rib and platform shaping walls 75' and 76' associated with the top die part 61B to progressively move into and downwardly deform the rib. During this downward deformation of the rib particularly in the region which extends longitudinally between the main support 73 and the anvil 81, the downward deformation of the rib causes longitudinal stretching of the material defining this portion of the rib, which stretching effectively occurs longitudinally toward and around the anvil 81 due to the progressive forming of the upward deformation 97 between the anvil 81 and the opposed cooperating recess 81'. At the same time the side formers 82' continue to progressively deform the valleys 19 downwardly into the former recesses 82 so as to result in the deformations 98, and this cooperation causes the excess material from the reshaped rib end portion to be drawn not only longitudinally away from the tapered rib end portion toward the recesses 82, but also effects sideward drawing and stretching of the material due to the disposition of these recesses 82 on opposite sides of the rib and their cooperation with the anvil 81 disposed therebetween. The overall net effect is that the cooperation between the upper and lower dies, and specifically the manner in which the side formers 82' on die part 61C straddle the anvil 81 and cause initial sideward stretching, with the subsequent longitudinal stretching caused by the top die part 61B contacting the top of the rib simultaneous with the longitudinal and sideward stretching which is concurrently experienced as a result of the forming of the deformations 97 and 98, is thus effective for removing excess material from the reshaped rib end portion such that the tapered rib portion 32, the platform 41 and the end flange 31 can be provided with minimized thickness variations and in particular minimized wrinkling or surface irregularities. Much of the excess material is thus effectively moved into the workpiece end portion 102 which extends from the cut line 99 to the free edge 100, with this excess material effectively being utilized in the forming of the deformations 97 and 98. This deformed portion 102 is then severed from the bed member generally along the plane 99 and is thereafter disposed of as scrap.

Figure 20:
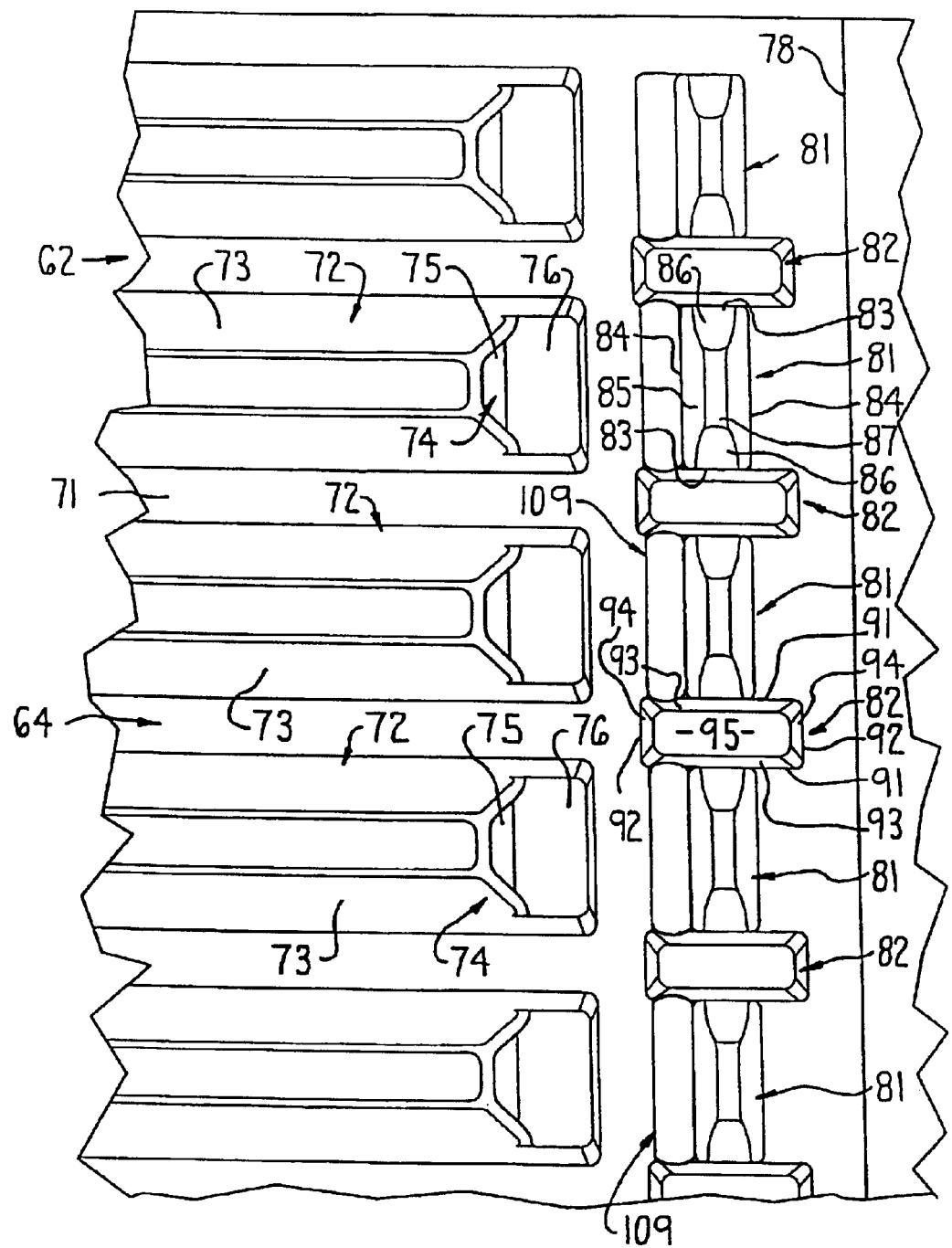
FIG. 20 is a view which corresponds to FIG. 13 but illustrates a modification of the upper forming surface associated with the bottom die.
Figure 21:
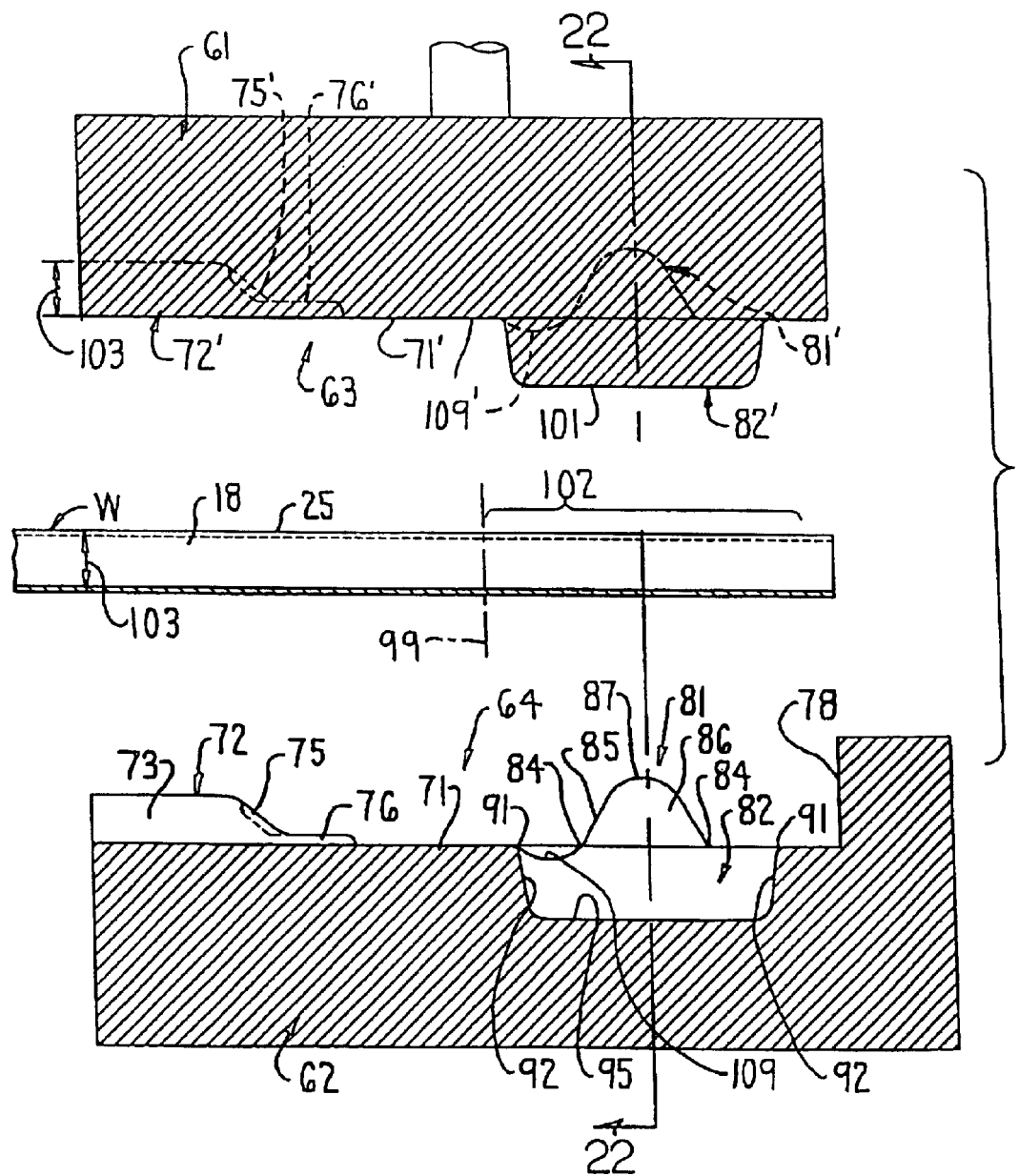
FIG. 21 corresponds to FIG. 16 but illustrates the modified construction of upper and lower die forming surfaces consistent with the arrangement shown in FIG. 20.
Figure 22:
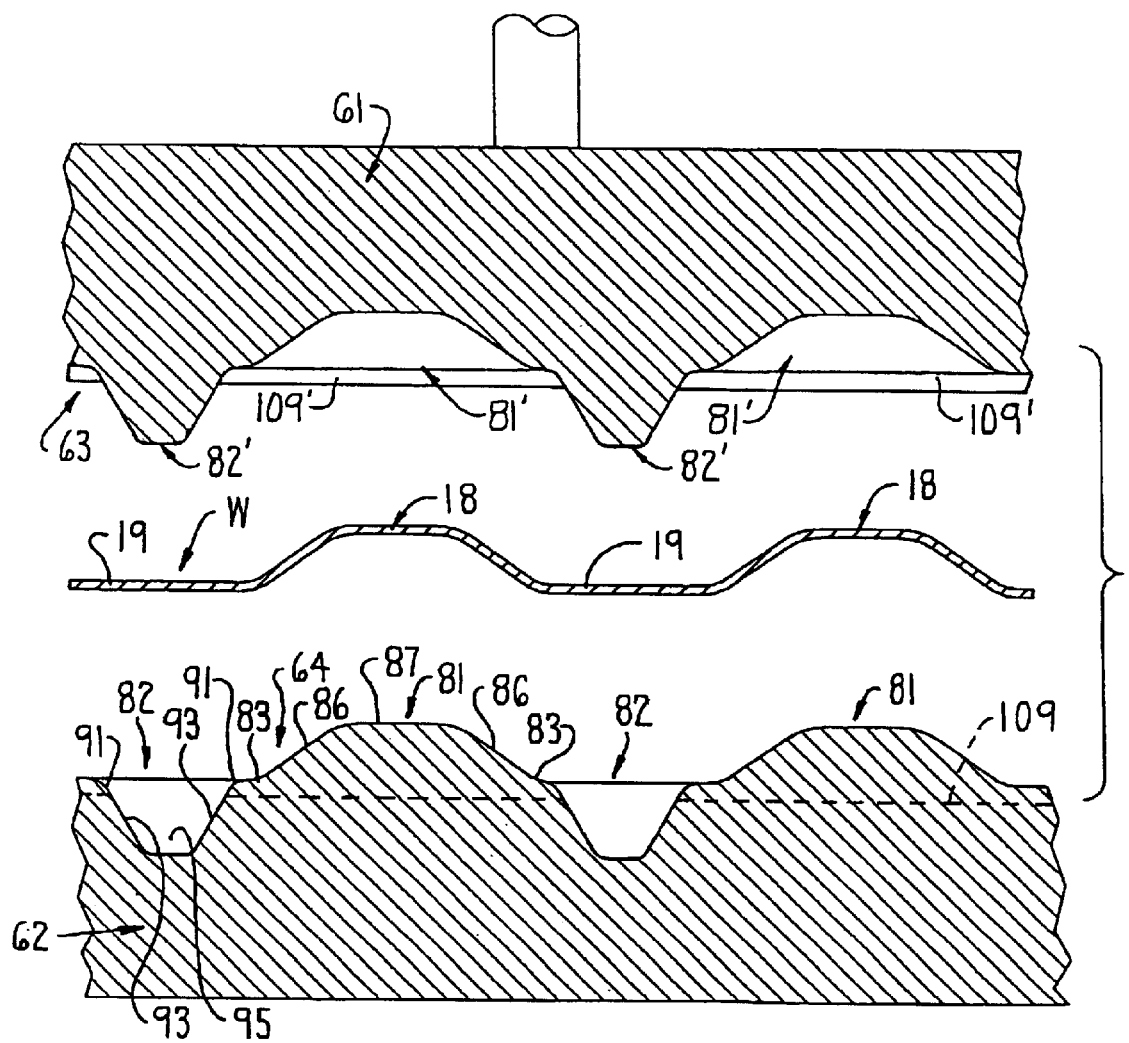
FIG. 22 is a sectional view of the modified forming surfaces as taken generally along line 22–22 in FIG. 21.

Referring now to FIGS. 20–22, there is illustrated a modified stamping die which incorporates all of the features associated with the die 61 illustrated in FIGS. 13–19, and hence FIGS. 20–22 utilize the same reference numerals to designate the corresponding parts which appear in the die of FIGS. 13–19.

In the die of FIGS. 20–22, however, the upper forming surface of the lower die has an additional surface deforming contour 109 formed therein, the latter being a recess which opens downwardly from the surface 71. This contour or recess 109 is disposed in the region between the anvil 81 and the adjacent end of the rib support part 72. The recess 109 has one edge thereof extending along the inner edge 84 of the anvil so that the recess 109 extends generally parallel with and is disposed sidewardly adjacent the anvil, and opposite ends of the recess 109 open into the projecting end portions of the side contours or recesses 82. The recess 109 in cross section (i.e., in a vertical plane extending longitudinally of the rib support part 72) has a generally rounded or arcuate cross section as reflected by the wall of the recess, with the depth of the recess being significantly smaller than the depth of the recesses 82. The depth of recess 109 is also significantly less than the height of anvil 81. This shallow recess 109, and its open communication with the end portions of the deeper recesses 82, results in a generally U-shaped channel or recess which straddles the anvil 81 on three sides thereof.

The bottom forming face associated with the upper die has formed thereon a downwardly protruding projection or male part 109' which extends lengthwise along the edge of the recess 81', and which at opposite ends joins to the protruding side formers 92'. The protrusion 109' has a height significantly less than the height of the side formers 82', and in particular the protrusion 109' has a size which generally corresponds to the recess 109 so as to effectively nest therein, with sheet metal trapped therebetween, when the dies are in a closed position.

With the modified die arrangement illustrated by FIGS. 20–22, the protrusion 109' will contact the top wall of the rib 18 at about the same time the side formers 82' contact the valleys of the workpiece W, and thus the initial deformation of the workpiece W caused by the side deformers 82' will be accompanied by additional deformation of the rib top wall by the protrusion 109', thereby effecting both sideward and longitudinal stretching of sheet metal material in the vicinity of the anvil 81, with the remaining deformation and stretching of the rib end occurring in generally the same manner as described above. The provision of the additional protrusion 109' and its projection into the recess 109 thus results in formation of a further deformation which effectively joins to one edge of the deformation 97 and is reversely contoured (i.e., contoured vertically downwardly) and extends in a direction toward the deformed sloped rib end, whereby additional excess material is effectively drawn longitudinally away from the deformed rib end into the scrap portion 102.

In view of the overall performance of the modified die illustrated by FIGS. 20–22, it is contemplated that the platform 76 associated with the reshaped rib end may be eliminated, whereupon the tapered rib end 75 can be merged downwardly directly into the flat edge flange 71. The overall length of the rib end can thus be shortened and the quantity of material being deformed reduced, with some of the excess material previously used for forming the platform 76 instead being longitudinally pulled into the scrap portion 102 to permit formation of the deformation created between the recess 109 and protrusion 109'.

In the improved bed member of this invention, and the process associated with manufacturing same, the bed member is preferably constructed from sheet steel having a maximum thickness of about 1.0 mm., with the thickness preferably being less than this amount and in one embodiment the thickness is preferably about 0.85 mm. Further, the longitudinally extending corners where the rib side walls join to the rib top wall, and where the rib side walls join to the base or valley walls, are preferably configured so as to be generated on a rather large radius, for example a radius of about 20 mm., since this minimizes the amount of material which is defined by the cross-sectional line of the rib, and also minimizes the sharpness of the break and hence the degree of cold working induced during roll forming, whereby the redistribution of the material during the deforming of the rib end portion can be more satisfactorily carried out. In addition, the raised platform 41 in the preferred embodiment will generally have the upper surface thereof disposed at an elevation above the valley base walls which will be about three to four times the sheet material thickness, with the elevation of the platform being in the neighborhood of about one-fourth to one-fifth the height of the rib.

With the forming process for forming a vehicle bed having reshaped rib ends as discussed above, the roll-formed workpiece may, as discussed above, be initially cut to length, following which one or both ends may then be subjected to the reshaping operation, either sequentially or simultaneously, and after such reshaping the scrap end portions 102 will then be removed.

In the contemplated process for manufacturing the bed member, after the roll-formed workpieces are cut to length, as diagrammatically depicted in FIG. 11, the workpieces will be horizontally rotated 90° and then transported in this transverse orientation into a stamping press provided with a pair of substantially identical (but mirror image) stamping dies at opposite sides, which dies will simultaneously act on and effect reshaping of both ends of the workpiece W. After both ends of the workpiece have been shaped so as to have a configuration substantially as illustrated by FIG. 12, the workpiece will then again be transported, still in its transverse orientation, into a subsequent working station wherein a pair of cutting devices are disposed adjacent opposite sides of the workstation so as to effect simultaneous severing or cutting at both ends of the workpiece to thus effect removable of the scrap portions 102. The bed member will then be transported for further handling as appropriate.

As an alternative forming process, the reshaping of the rib ends according to the present invention may also be accomplished while the roll-formed bed member remains connected to the continuous profile P which is being discharged from the roll mill. In this latter variation, the leading free end of the profile could be fed into the stamping die so as to permit reshaping thereof and severing of the scrap portion, with the workpiece having one end already reshaped then being severed from the continuous profile and, if desired, the other end subjected to a reshaping process.

As a still further alternative, the reshaping of the rib ends for a bed member wherein both ends are being reshaped can be carried out when continuous with and joined to the profile P discharged from the roll mill. In this situation, the shaping die would have two sets of opposed reshaping surfaces associated therewith in slightly spaced relationship. For example, as illustrated in FIGS. 13–19, the upper and lower die members could be provided with the respective forming surfaces 72 and 72' projecting longitudinally horizontally away from both sides of the row of reshaping contours 81 and 82. By then feeding the profile between the dies and effecting operation thereof, the rib ends associated with the trailing end of one bed member and associated with the leading end of the adjacent bed member would thus be simultaneously formed, following which the intermediate scrap portion joining the two end portions together would be severed at two locations so as to effect removal thereof, and separation between the two bed members. The trailing bed member would then be advanced through a length corresponding to the workpiece so as to permit the next forming operation which would cause the other end of the advanced bed member to be appropriately reshaped.

In the arrangements wherein the reshaping of the rib ends is carried out while the bed member is still joined to the continuous roll-formed profile, it is recognized that such procedure will probably require a momentary stoppage of the profile so as to permit the rib end stamping operation to be performed.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A vehicle bed member comprising a monolithic one-piece bed member constructed of thin sheetlike metal, the bed member having a plurality of downwardly-opening channel-like ribs formed therein in sidewardly spaced relation and extending longitudinally of the bed member in generally parallel relationship and terminating adjacent transversely extending front and rear end edges, the ribs being generally uniform along the length thereof and adjacent one end of the bed member being joined to downwardly sloped rib portions which taper down from the top of the full height ribs for merger with a flat edge flange which extends transversely across the width of the bed member with said flat edge flange defining thereon one said end edge of said bed member, wherein the tapered rib portion has a sloped top wall which at an upper end joins to the top wall of the full height rib and which slopes downwardly therefrom and at its lower end joins to one edge of a raised flat platform which is formed in and spaced upwardly a small distance above the flat edge flange with said raised flat platform extending longitudinally away from the lower end of said sloped top wall to a rear edge which is disposed more closely adjacent but spaced inwardly from said one and edge of said flat edge flange, said raised flat platform having a transversely extending width which approximately corresponds to and is generally aligned with the width of the respective rib, and said flat edge flange extending between transversely adjacent raised platforms for substantially coplanar joinder with the floor of the valleys defined between adjacent ribs.

2. A bed member according to claim 1, wherein the raised platform is a substantially planar wall which extends generally parallel with but is offset upwardly from said flat end flange with said platform defining a recess thereunder.

3. A bed member according to claim 1, wherein said bed member including said ribs, said sloped end walls, said raised platforms and said end flange are all of substantially the same thickness.

4. A bed member according to claim 1, wherein said raised platform has a large and substantially horizontally planar upper surface which is substantially coextensive of the platform.

5. A bed member according to claim 4, wherein the raised platform has side edges which raise the platform upwardly relative to the flit edge flange, and said side edges being generally aligned and continuous with side walls of the respective channel-like rib.

6. A vehicle bed according to claim 4, wherein the sloped top wall of the tapered rib portion has a large and generally flat center wall portion which slopes downwardly from the top wall of the full height rib for joinder with the raised platform, and said tapered rib portion including side edge portions which are positioned on opposite sides of the flat center wall portion and slope downwardly from adjacent the top wall of the full height rib for merger with said raised platform adjacent opposite side edges thereof, said center wall portion being offset vertically downwardly relative to said side edge portion, and said side edge portions in transverse cross section being generally convexly rounded channels for merger with side walls of the respective channel-like rib.

7. A bed member according to claim 6, wherein the center wall portion of the tapered rib portion along an upper edge thereof is joined to the top wall of the respective rib through a smoothly bent top edge portion which extends across the width of the rib top wall, said top edge portion having a first convexly rounded part which joins to the rib top will and smoothly curves downwardly for merger with a concavely curved portion which joins to the upper edge of said center wall portion.

8. A process for forming a monolithic one-piece vehicle bed member, comprising:

roll-forming a large thin steel sheet in a lengthwise direction to define a three-dimensional workpiece member having a flat base wall and a plurality of substantially sidewardly displaced and parallel channel-like ribs which project upwardly from the base wall and open downwardly thereof with said ribs extending lengthwise throughout the length of the workpiece member;

reshaping a transversely extending portion of said workpiece member adjacent one end thereof to effect flattening and reshaping of end portions of said ribs to create on each said rib a downwardly sloped rib end part which closes off the end of the respective rib and which terminates in a flat edge flange which is generally coplanar with the base wall of the workpiece and extends transversely across the workpiece adjacent said one end thereof;

said reshaping step including deforming the rib end portion downwardly toward the base wall to effect forming of (1) a eloped rib end wall which slopes downwardly from the rib top wall toward said base wall, (2) a generally flat and horizontal platform wall which is joined to a lower end of said sloped rib end wall and which projects longitudinally away from the sloped rib end wall in a disposition wherein the platform is elevated a small distance above the base wall and which terminates in a remote edge, and (3) a flat flange which is substantially coplanar with the base wall and projects longitudinally away from the remote edge of said platform; and said reshaping step also including stretching the rib end portion longitudinally during the deforming thereof to effect displacement of excess material created due to the deforming of the rib end portion longitudinally away from the sloped rib end part to minimize, formation, of wrinkles.

9. A process according to claim 8, including the steps of:

providing the workpiece member with a disposable part which is monolithically and integrally joined to the worlkpiece member over a selected length thereof and which extends transversely across the workpiece member adjacent said transversely extending portion so as to be positioned longitudinally adjacent and joined to said transversely extending portion which is reshaped; and deforming rib parts which traverse said disposable part downwardly toward said base wall simultaneous with the deforming of the rib end portions, and substantially simultaneously deforming said base wall at regions located between said rib parts downwardly away from said base wall in a direction opposite from said rib parts, whereby excess material associated with the deformed rib end portions of said workpiece member is drawn longitudinally into said disposable part.

10. A process according to claim 9, including the step of transversely cutting said bed workpiece member along a line which defines the edge of said flat edge flange so as to effect separation of the bed member from the disposable part.

11. A process according to claim 9, including the step of transversely deforming the rib part of said disposable part downwardly over an anvil which projects upwardly above said base wall so as to create a raised hollow projection in said disposable part.

12. A process according to claim 11, wherein the downward deformation of the base wall of said disposable part results in formation of a pair of downwardly projecting hollow deformations which are positioned to substantially sidewardly straddle said hollow projection, with said projection and said deformations projecting in opposite directions from said base wall.

13. A process according to claim 12, wherein the deforming of the base wall to create said deformation is initiated prior to the deforming of the rib part so as to create said hollow projection, and the deforming so as to create said projection and said deformations thereafter continuing simultaneously.

14. A process according to claim 12, wherein said deformations are elongated in the longitudinal direction of the rib parts and are disposed generally within and have a transverse width substantially corresponding to the width of the base wall defining the valley between adjacent rib parts.

15. A process according to claim 14, wherein the hollow projection is elongated in a direction transverse to the longitudinal direction, of the rib and has a length in said transverse direction which generally corresponds to the transverse width of the respective rib and is substantially longitudinally aligned therewith.

16. A process for forming a monolithic one-piece vehicle bed member, comprising the steps of:

forming a large thin steel sheet into a three-dimensional workpiece member having a flat base wall and a plurality of substantially sidewardly displaced and parallel channel-like ribs which project upwardly from the base wall and open downwardly thereof with paid ribs extending lengthwise throughout the length of the workpiece member;

providing a stamping press having opposed and relatively vertically movable upper and lower forming dies having opposed forming surfaces thereon adapted to engage and reshape a longitudinally elongate portion of said workpiece member therebetween;

providing the forming face of one said forming die with a plurality of vertically projecting rib supports which are adapted to supportingly engage an inner surface of a respective said rib associated with the workpiece member, the rib support having at one end thereof a sloped end portion which is sloped downwardly from a top wall of the rib support;

providing the forming surface of said one die member with a vertically protruding anvil which is longitudinally aligned with but spaced from the sloped end part of the rib support and which is positioned between a pair of forming recesses which are disposed to substantially sidewardly straddle the anvil and which project vertically into the forming die in a direction opposite to the vertical projection of the anvil;

providing the forming surface of the other forming die with a plurality of adjacent rib accommodating recesses which are generally vertically aligned with and shaped to nestingly receive therein the protruding rib supports associated with said one forming die, additionally providing said other forming die with a vertically protruding anvil-receiving recess and a pair of vertically protruding farmers which sidewardly straddle the anvil-receiving recess and protrude vertically in the opposite direction relative thereto, said anvil-receiving recess and said farmers being generally vertically aligned with and sized and shaped to nestingly engage with the respective anvil and forming recesses associated with said one die;

positioning the formed workpiece member between the open dies so that a first longitudinally elongate part of the workpiece member has the ribs thereof disposed around the sloped end portions of the protruding rib supports of said one die and has a second longitudinally elongate part which is monolithically and integrally joined adjacent said first elongate part and which has the ribs thereof disposed around and in supportive engagement with the respective anvil;

relatively moving said first and second forming dies toward one another to effect engagement of the workpiece member between the opposed forming faces; and continuing the relative inward movement of the first and second dies toward one another to cause vertical compression of rib parts associated with the first and second longitudinally elongate parts of the workpiece member so that the ribs in said first elongate part are reshaped over the sloped end portion and the ribs in the second elongate part are reshaped over the respective anvil so as to effect drawing of excess material longitudinally away from the sloped end portion toward the anvil.

17. A process according to claim 16, including effecting vertical deformation of the valley base walls associated with said second elongated part in sideward straddling relationship to the anvil so as to effect formation of two vertical second protrusions which sidewardly straddle and protrude in the opposite vertical, direction from a first protrusion formed around the anvil, whereby said protrusions effect drawing of excess material longitudinally out of said first longitudinal part into said second longitudinal part.

18. A process according to claim 17, wherein the step of forming said second protrusions is initiated a short time prior to the initiation of the deforming of the top wall of the ribs.

19. A process according to claim 16, including the step of transversely cutting the formed workpiece member between the first and second longitudinally elongate parts after deforming of the workpiece member between the forming dies to effect separation of said second longitudinally elongate part from the workpiece member.

20. A process according to claim 12, including the step transversely cutting said workpiece member along a which defines the edge of said flat edge flange so as to effect of the bed member from the disposable part.

21. A process according to claim 8, including the steps of:
providing the workpiece member with a disposable part which is monolithically and integrally joined to the workpiece member over a selected length thereof and which extends transversely across the workpiece member adjacent said transversely extending portion so as to be positioned longitudinally adjacent and joined to said transversely extending portion which is reshaped; and
deforming said disposable part transversely relative to said base wall simultaneous with the deforming of the rib end portions for causing excess material associated with the deformed rib end portions to be drawn longitudinally into said disposable part.

22. A process for forming a monolithic one-piece truck bed member, comprising:
roll-forming a large thin metal sheet in a lengthwise direction to define a three-dimensional workpiece member having a flat base wall and a plurality of substantially sidewardly displaced and parallel channel-like ribs which project upwardly from the base wall and open downwardly thereof with said ribs extending lengthwise throughout the length of the workpiece member;
reshaping a transversely extending portion of said workpiece member adjacent one end thereof to effect flattening and reshaping of end portions of said ribs to create on each said rib a downwardly sloped rib end part which closes off the end of the respective rib;
said reshaping step including deforming the rib end portion downwardly toward the base wall to effect forming of (1) a sloped rib end wall which slopes, downwardly from the rib top wall toward said base wall, (2) a generally flat and horizontal platform wall which is joined to a lower end of said sloped rib end wall and which projects longitudinally away from the sloped rib end wall in a disposition wherein the platform is elevated a small distance above the base wall and which terminates in a remote edge, and (3) a flat flange which is substantially coplanar with the base wall and projects longitudinally away from the remote edge of said platform; and
said reshaping step also including stretching the rib end portion longitudinally during the deforming thereof to effect displacement of excess material created due to the deforming of the rib portion longitudinally away from the sloped rib end part to minimize formation of wrinkles.

23. A process according to claim 22, including the steps of:
providing the workpiece member with a disposable part which is monolithically and integrally joined to the workpiece member over a selected length thereof and which extends transversely across the workpiece member adjacent said transversely extending portion so as to be positioned longitudinally adjacent and joined to said transversely extending portion which is reshaped;
deforming said disposable part transversely relative to said base wall simultaneous with the deforming of the rib end portions for causing excess material associated with the deformed rib end portions to be drawn longitudinally into said disposable part; and
transversely cutting said workpiece member along a line which extends along the flat end flange in spaced relation from the remote edge of the platforms to effect separation of the bed member from the disposable part.

* * * * *

UNITED STATES PATENT AND TRADEMARK OFFICE
CERTIFICATE OF CORRECTION

PATENT NO. : 6,799,792 B2
DATED : October 5, 2004
INVENTOR(S) : Joseph J. Jurica et al.

It is certified that error appears in the above-identified patent and that said Letters Patent is hereby corrected as shown below:

Column 15,
Line 61, change "and" to -- end --.

Column 16,
Line 6, after "end" insert -- top --.
Line 15, change "flit" to -- flat --.
Line 28, change "portion," to -- portions, --.
Line 37, change "will" to -- wall --.
Line 62, change "eloped" to -- sloped --.

Column 17,
Line 11, after "formation" delete ",".
Line 15, change "worlkpiece" to -- workpiece --.
Line 30, delete "bed"
Line 46, change "deformation" to -- deformations --.
Line 58, change "direction," to -- direction --.

Column 18,
Line 1, change "paid" to -- said --.
Line 31, change "farmers" to -- formers --.
Line 34, change "farmers" to -- formers --.
Line 64, after "vertical" delete ",".

Column 19,
Line 11, after "step" insert -- of --.
Line 12, after "a" insert -- line --.
Line 13, after "effect" insert -- separation --.

UNITED STATES PATENT AND TRADEMARK OFFICE
CERTIFICATE OF CORRECTION

PATENT NO.   : 6,799,792 B2
DATED        : October 5, 2004
INVENTOR(S)  : Joseph J. Jurica et al.

It is certified that error appears in the above-identified patent and that said Letters Patent is hereby corrected as shown below:

Column 20,
Line 5, after "slopes" delete ",".

Signed and Sealed this

Seventeenth Day of May, 2005

JON W. DUDAS
*Director of the United States Patent and Trademark Office*